(12) United States Patent
Wang et al.

(10) Patent No.: US 6,441,960 B1
(45) Date of Patent: Aug. 27, 2002

(54) OPTICAL INTERLEAVERS WITH MINIMIZED DISPERSION

(75) Inventors: Mark S. Wang; Wei-Zhong Li, both of San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/653,759

(22) Filed: Sep. 1, 2000

Related U.S. Application Data

(60) Provisional application No. 60/199,079, filed on Apr. 20, 2000.

(51) Int. Cl.[7] .................................................. G02B 5/30
(52) U.S. Cl. ....................... 359/497; 359/129; 359/496; 359/495; 385/36
(58) Field of Search ................................ 359/117, 124, 359/127, 128, 129, 494, 495, 496, 497; 385/31, 36

(56) References Cited

U.S. PATENT DOCUMENTS 5,694,233 A 12/1997 Wu et al. .................... 359/117
6,208,444 B1 * 3/2001 Wong et al. ................. 359/127
6,288,807 B1 * 9/2001 Wu et al. .................... 359/122

* cited by examiner

Primary Examiner—Darren Schuberg
(74) Attorney, Agent, or Firm—Fish and Richardson P.C.

(57) ABSTRACT

The present invention provides a line of optical interleavers in which a novel beam-swapping element is utilized. The beam-swapping element of the present invention provides an effective and inexpensive alternative to polarization rotators and birefrigent elements employed in the prior art optical interleavers, hence rendering a simple and low-cost assembly to the optical interleavers of the present invention. The optical interleavers of the present invention further advantageously exploit a combination of two wavelength filters to cancel out wavelength-filter-induced-dispersion. Efforts are also painstakingly made in the optical interleavers of the present invention to substantially minimize other dispersion effects. As such, the optical interleavers of the present invention constitute the first kind in the art in which various dispersion effects are substantially minimized. Such characteristics would be highly desirable in fiber-optic networks. The optical interleavers of the present invention can be advantageously configured as multiplexers, de-multiplexers, or routers.

56 Claims, 12 Drawing Sheets

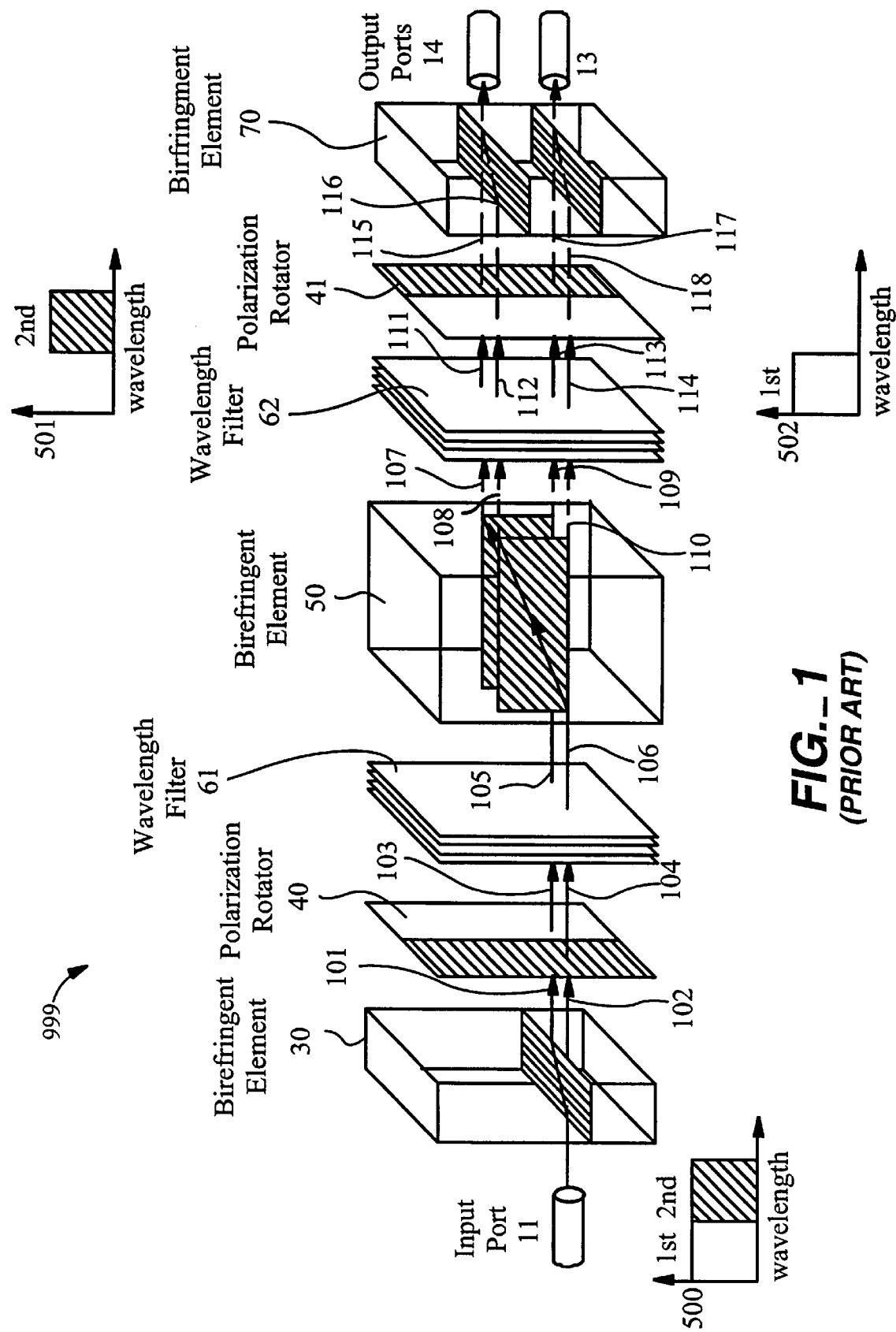
FIG._1
*(PRIOR ART)*

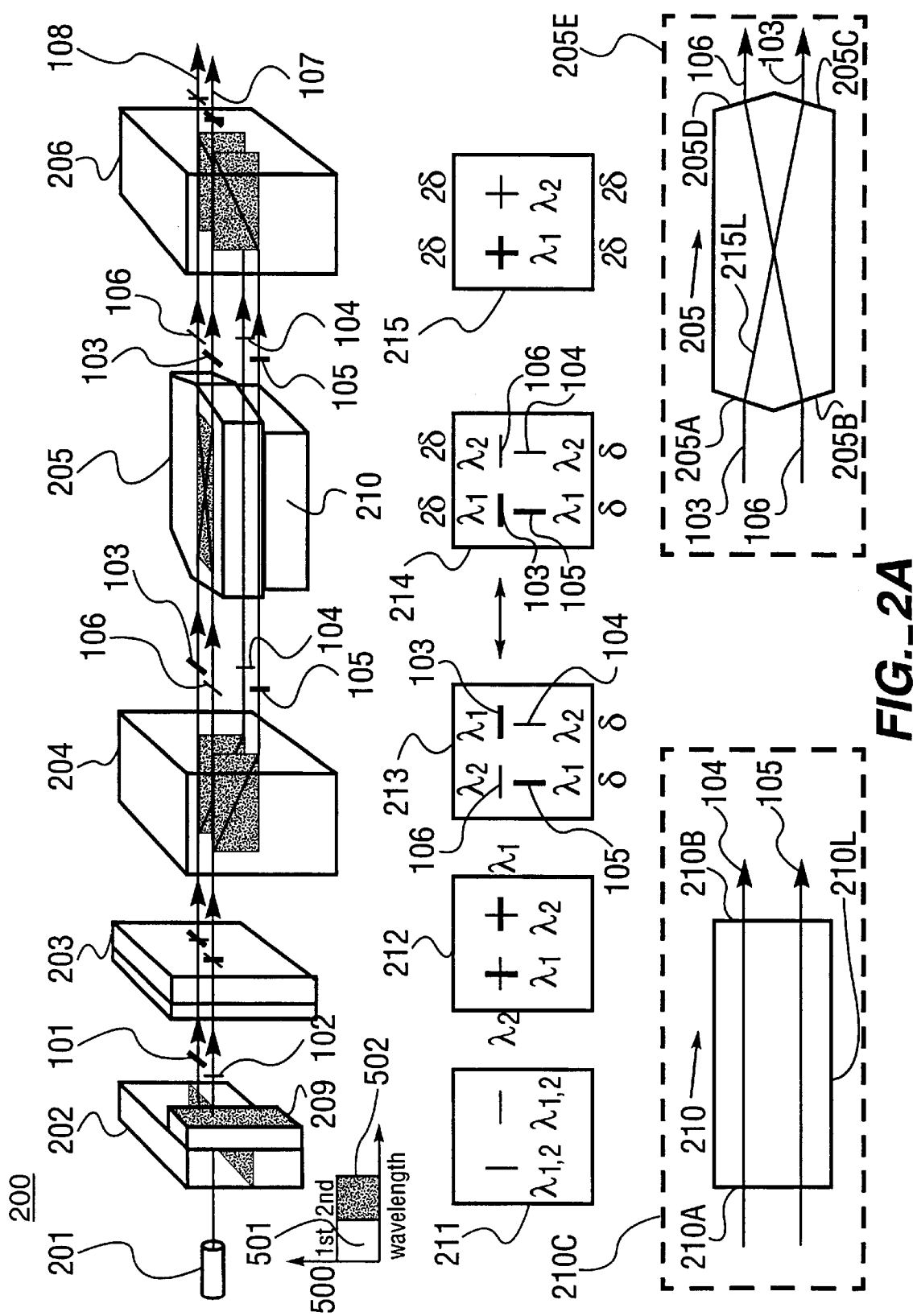
FIG._2A

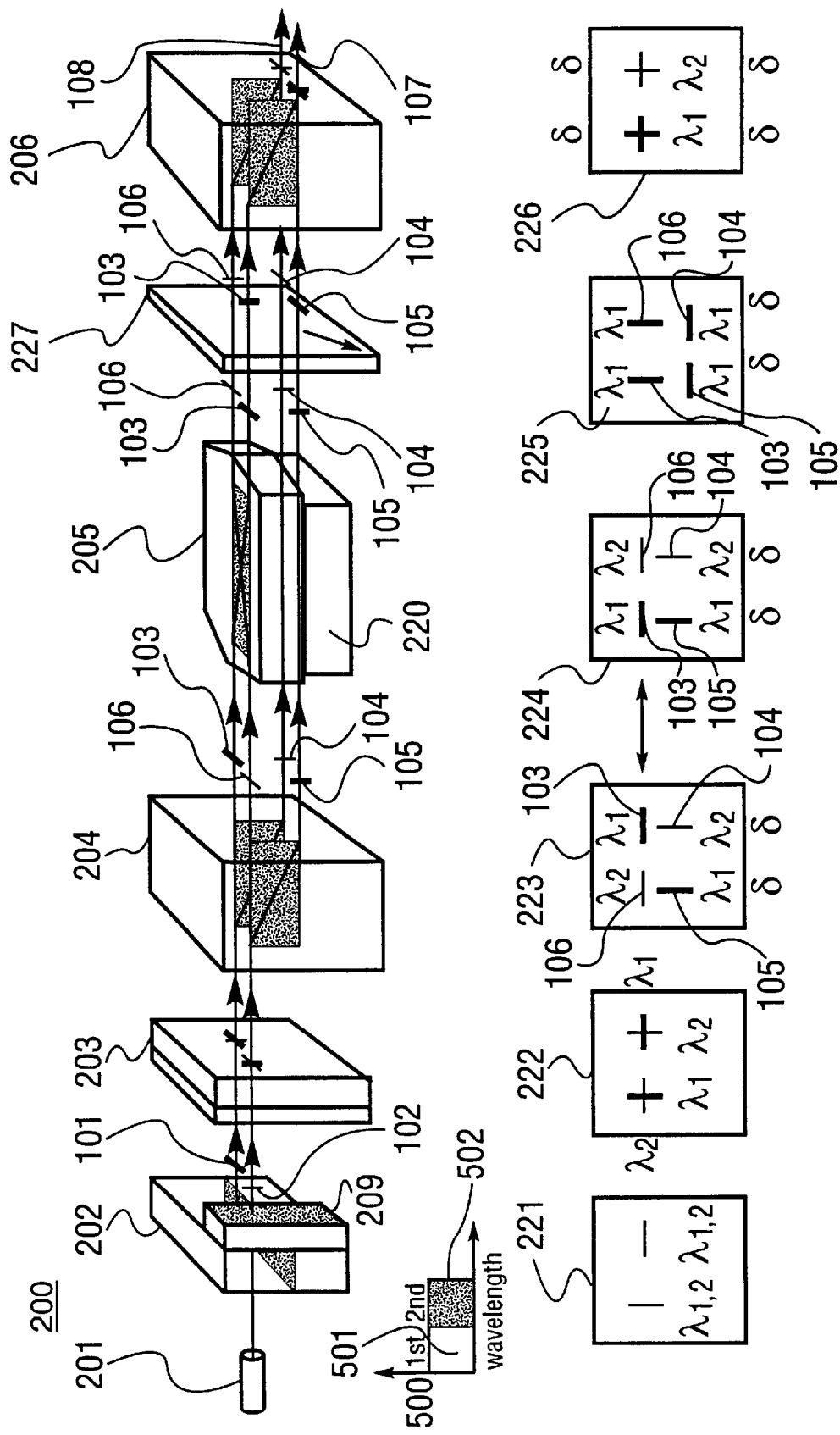
FIG._2B

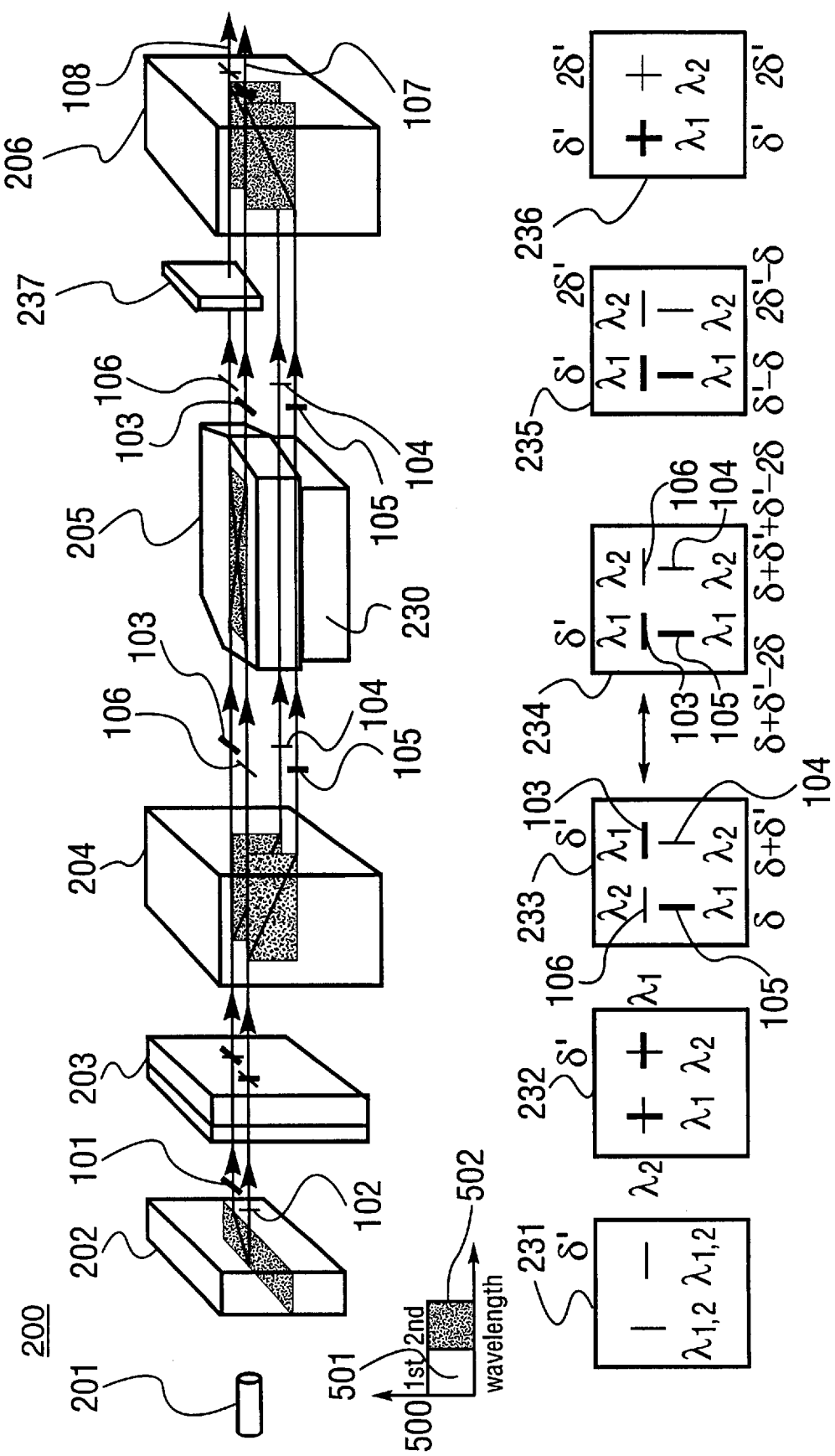
FIG._2C

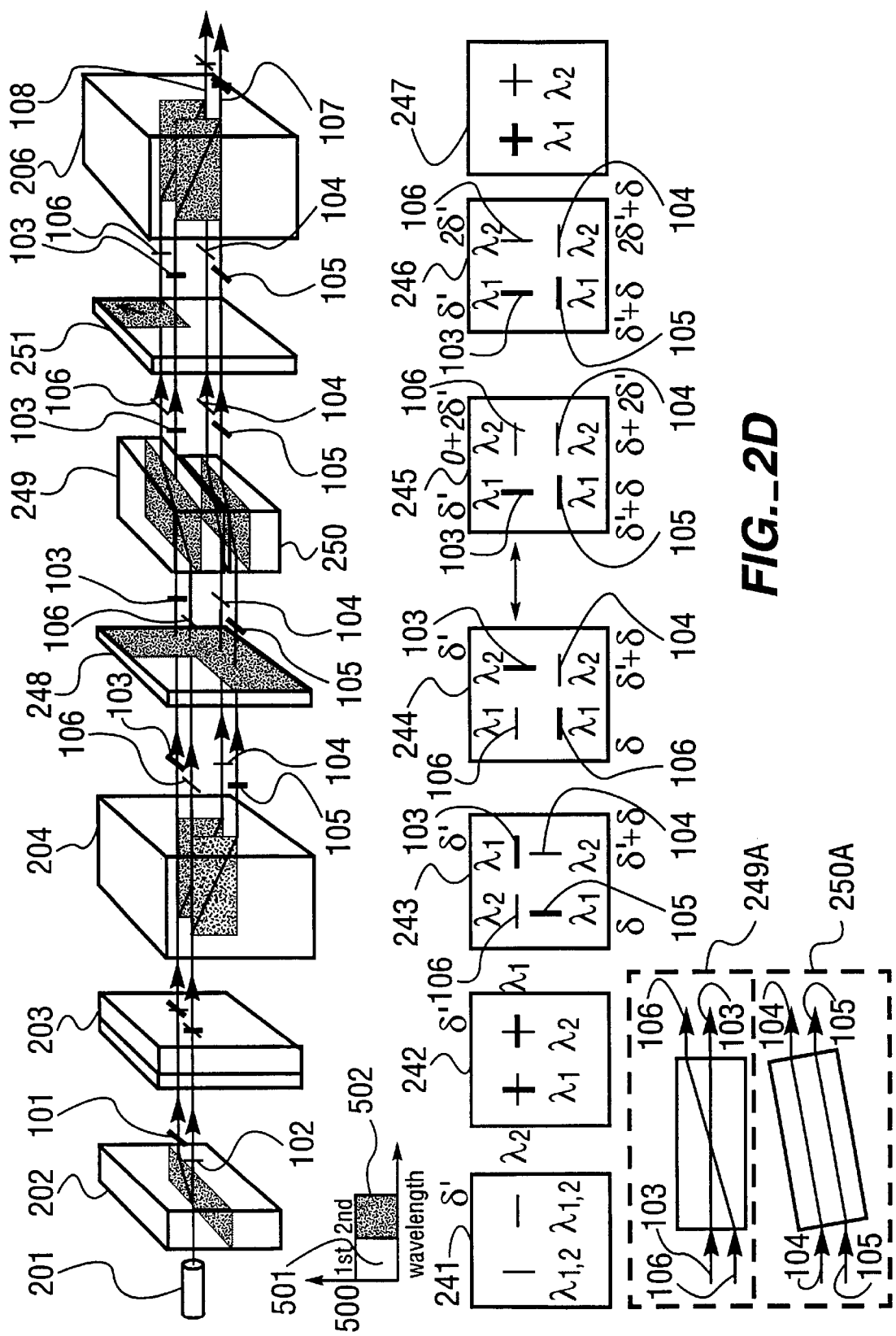
FIG._2D

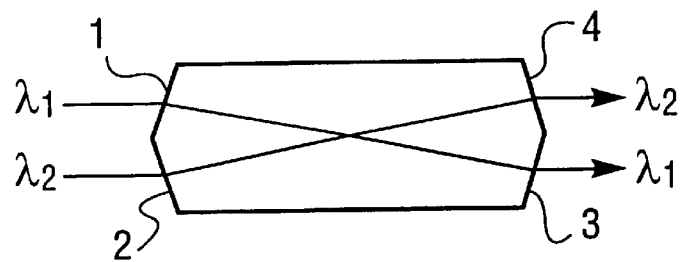
FIG._3A
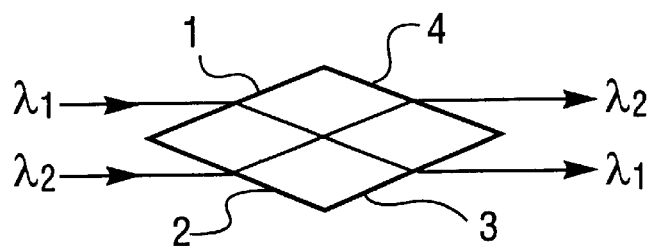
FIG._3B
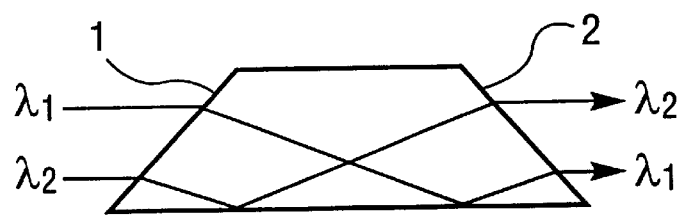
FIG._3C
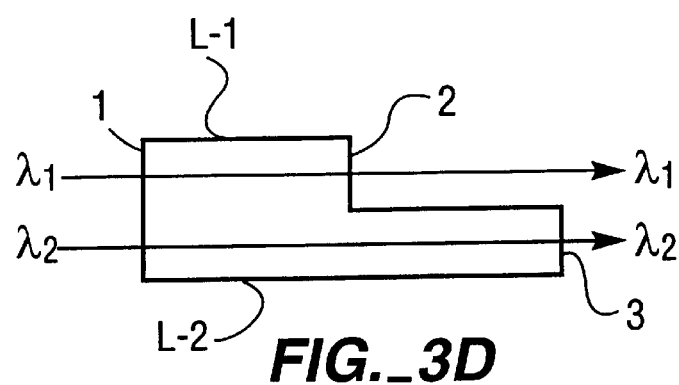
FIG._3D

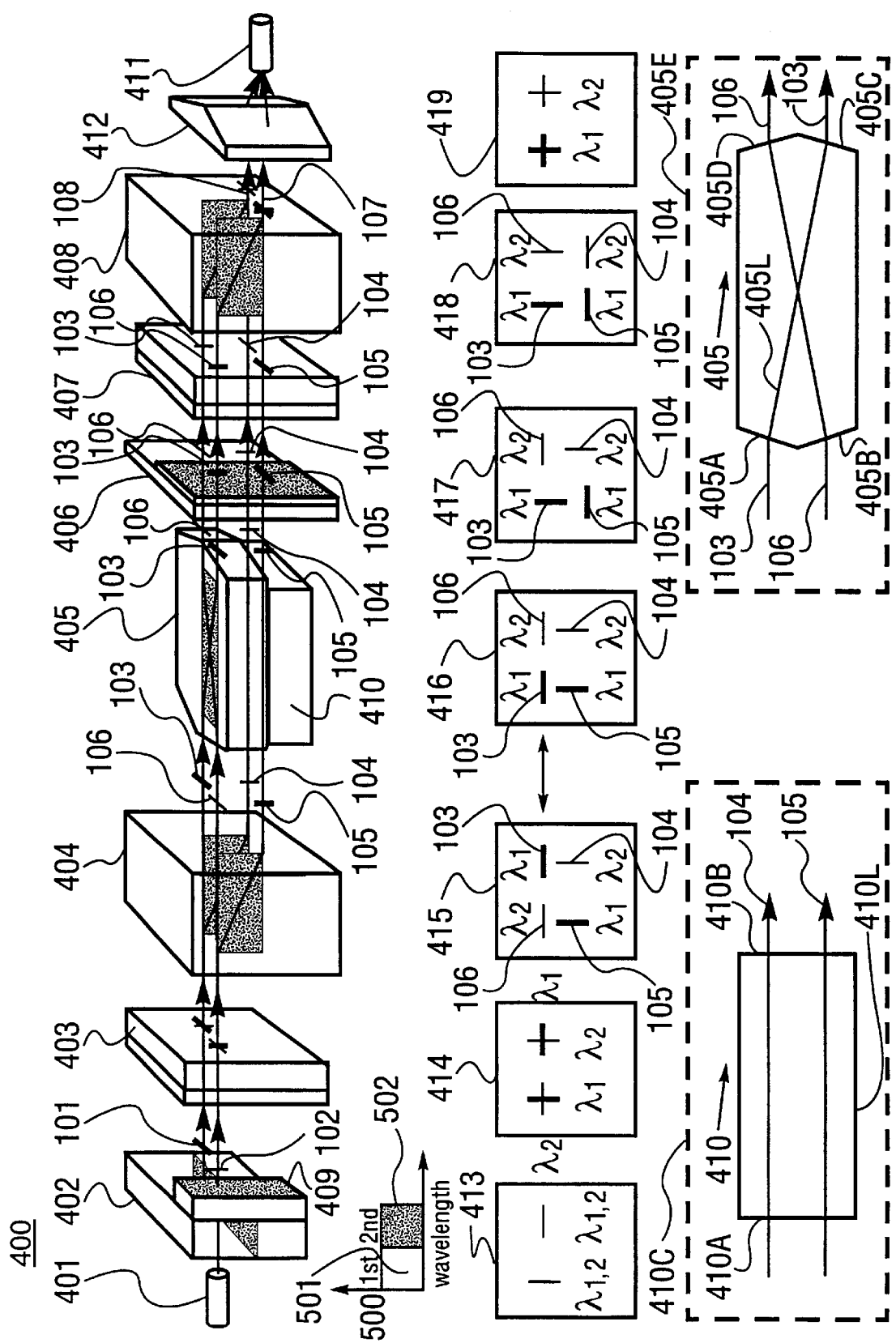
FIG._4A

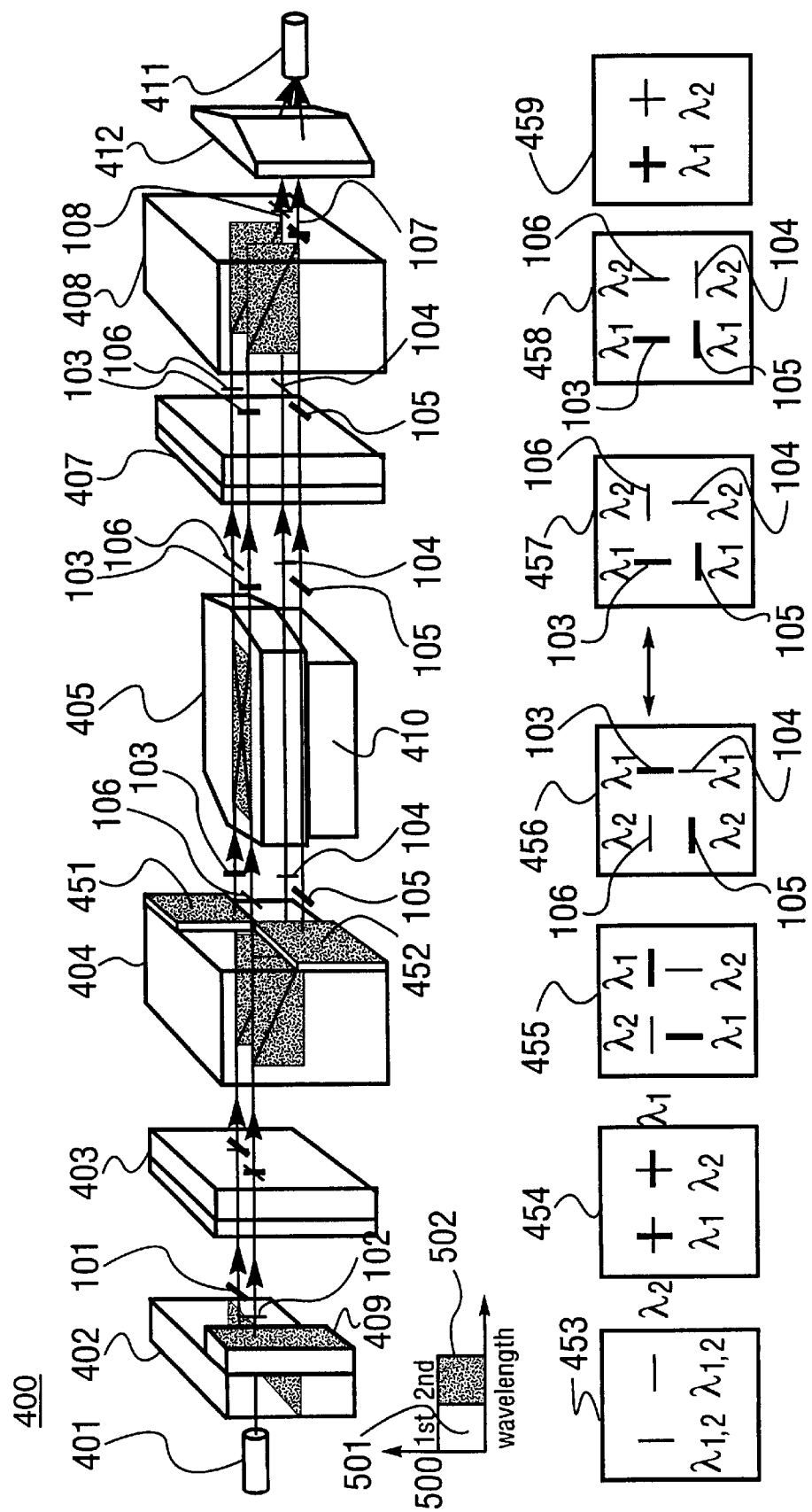
FIG._4B

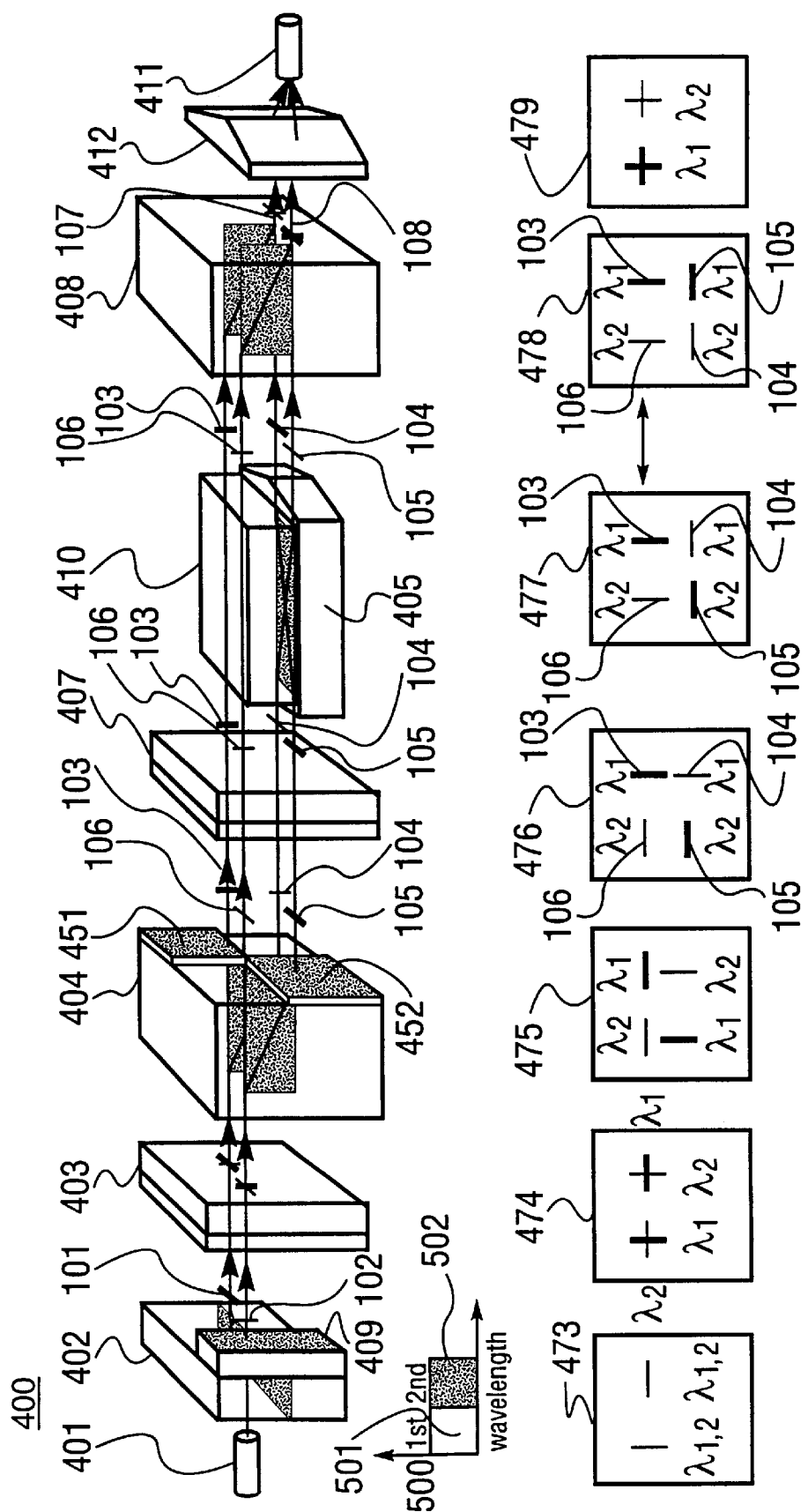
FIG._4C

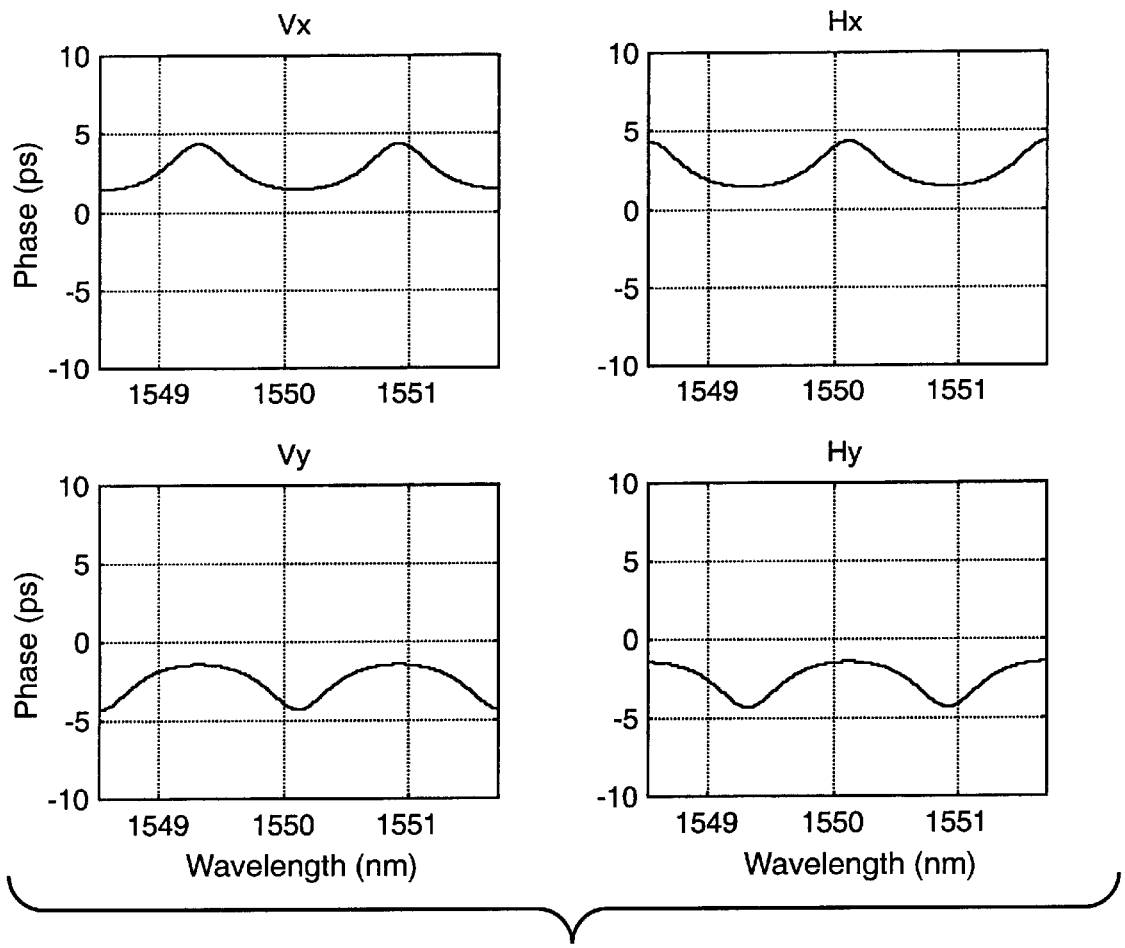
FIG._5

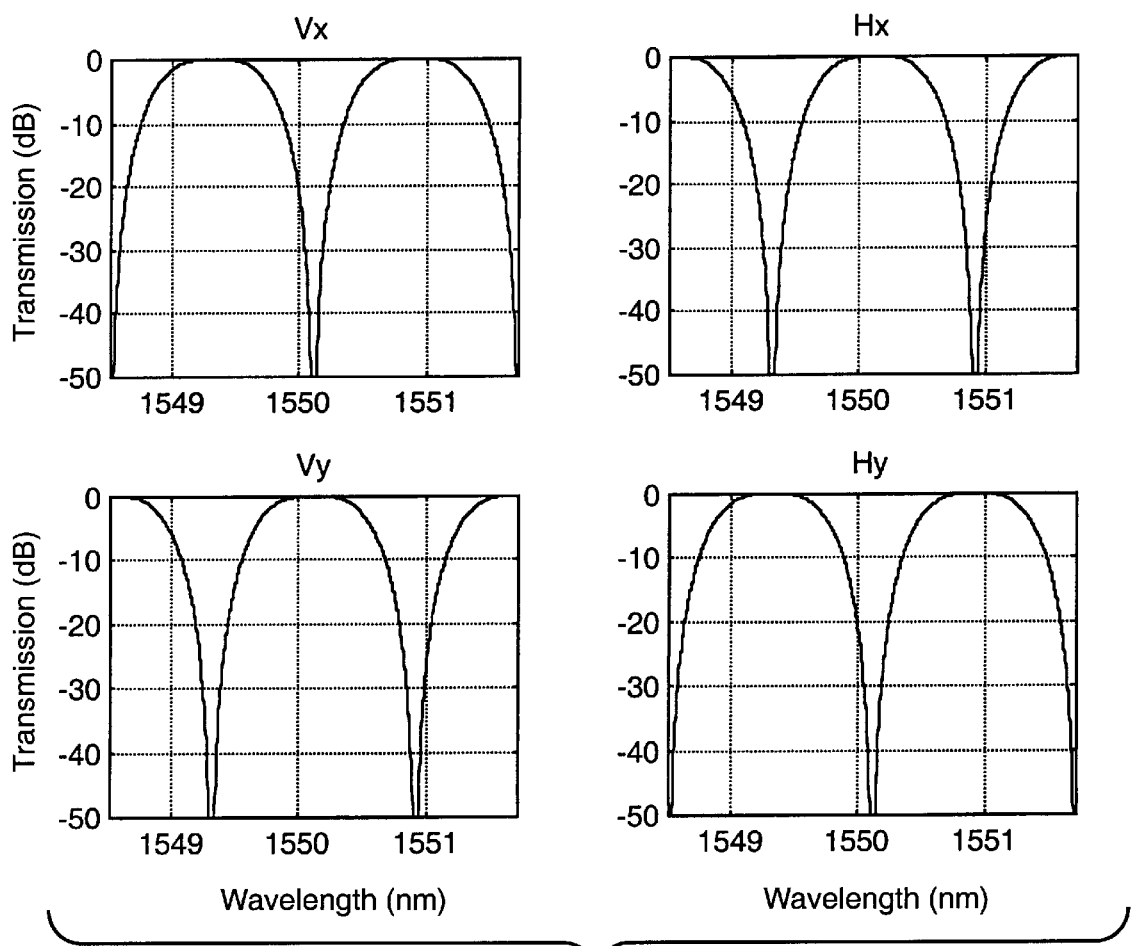
FIG._6

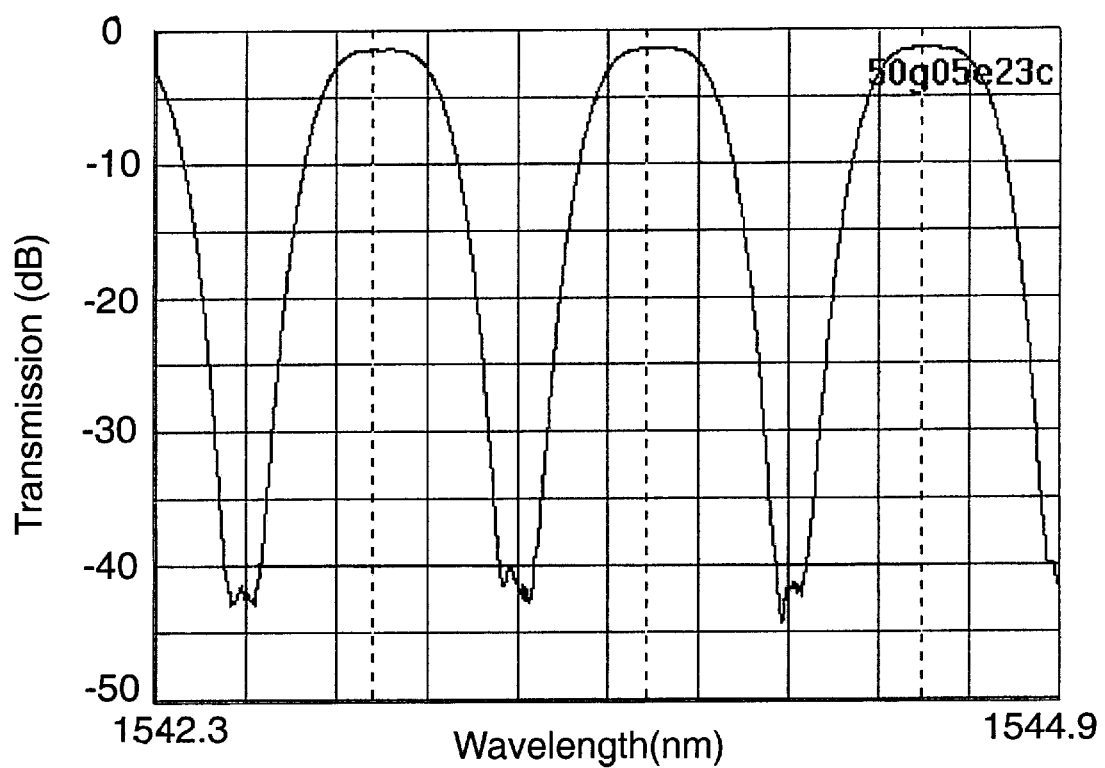
FIG._7

OPTICAL INTERLEAVERS WITH MINIMIZED DISPERSION

CROSS-REFERENCES TO RELATED APPLICATIONS

This application claims the benefits of Provisional Application 60/199,079 filed Apr. 20, 2000, which is herein incorporated by reference for all purposes.

FIELD OF THE INVENTION

This invention relates generally to optical communications systems. More particularly, it provides a novel class of optical interleavers with substantially minimized dispersion for multiplexing or de-multiplexing of optical signals.

BACKGROUND ART

Wavelength division multiplexing (WDM) has emerged as the standard technique to transmit information in fiber-optic networks. This is because as the bandwidth of fiber data increases, electronic sorting becomes increasingly complex, while wavelength routing becomes ever more practical and elegant.

In a WDM system, each optical fiber simultaneously carries many different communications channels in light of respectively different wavelengths. Each channel is modulated by one or more information signals. As a result, a significant number of information signals may be transmitted over a single optical fiber using WDM technology.

WDM systems use components generically referred to as optical interleavers to combine, split, or route optical signals of different channels. Interleavers typically fall into one of three categories, multiplexers, de-multiplexers and routers. A multiplexer takes optical signals of different channels from two or more different input ports and combines them so that they may be coupled to an output port for transmission over a single optical fiber. A de-multiplexer performs the opposite process, that is, it decomposes an optical signal containing two or more different channels according to their wavelength ranges and directs each channel to a different dedicated fiber. A router works much the same way as a de-multiplexer; however, a router can selectively direct each channel according to control signals to a desired coupling between an input channel and an output port.

FIG. 1 depicts a typical optical interleaver 999 of the prior art as described in U.S. Pat. No. 5,694,233, which is incorporated herein by reference. A WDM signal 500 containing two different spectral sets 501, 502 enters interleaver 999 at an input port 11. AS used herein, the term "spectral set" refers to a particular range of wavelengths or frequencies that defines a unique information signal. A first birefringent element 30 spatially separates WDM signal 500 into horizontal and vertically polarized components 101 and 102 by a horizontal walk-off. Component signals 101 and 102 both carry the full frequency spectrum of the WDM signal 500.

Components 101 and 102 are coupled to a polarization rotator 40. The rotator 40 selectively rotates the polarization state of either signal 101 or 102 by a predefined amount. By way of example, in FIG. 1 signal 102 is rotated by 90° so that signals 103, 104 exiting rotator 40 are both horizontally polarized when they enter a wavelength filter 61.

Wavelength filter 61 selectively rotates the polarization of wavelengths in either the first or second spectral set to produce filtered signals 105 and 106. For example, wavelength filter 61 rotates wavelengths in the first spectral set 501 by 90° but does not rotate wavelengths in the second spectral set 502 at all.

The filtered signals 105 and 106 enter a second birefringent element 50 that vertically walks off the first spectral set into beams 107, 108. The second spectral set forms beams 109, 110.

A second wavelength filter 62 then selectively rotates the polarizations of signals 107 and 108, but not signals 109 and 110, thereby producing signals 111, 112, 113, 114 that have polarizations parallel to each other. A second polarization rotator 41 then rotates the polarizations of signals 111 and 113, but not the polarizations of signals 112 and 114. The resulting signals 115, 116, 117, and 118 then enter a third birefringent element 70. Note that second wavelength filter 62 may alternatively be replaced by a polarization rotator suitably configured to rotate the polarizations of signals 111 and 113, but not 112 and 114.

Third birefringent element 70 combines signals 115 and 116, into the first spectral channel, which is coupled to output port 14. Birefringent element 70 also combines signals 117 and 118 into the second spectral channel, which is coupled into output port 13.

As described above, interleaver 999 operates as a de-multiplexer. By operating interleaver 999 in reverse, i.e., starting with spectral sets 501, 502 at ports 13 and 14 respectively, interleaver 999 operates as a multiplexer. Furthermore, by suitably controlling the polarization rotation induced by rotators 40 and 41, interleaver 999 may be configured to operate as a router.

Interleaver 999 described above advantageously uses wavelength filters to separate an input WDM optical signal containing two spectral sets by way of different polarization modes and subsequently exploits the birefrigent walk-off effect to spatially separate different polarization modes, thereby de-multiplexing the input WDM optical signal. The use of the wavelength filters and birefrigent materials, however, inadvertently introduces various dispersion effects, which would degrade the performance of fiber-optic networks if uncompensated for. For instance, there is Polarization Mode Dispersion (PMD) known in the art, owing to the fact that different polarization modes traverse different optical path lengths in a birefrigent material. Moreover, since a wavelength filter is typically composed of a stacked plurality of birefrigent waveplates, different wavelengths of light undertake different polarizations in various constituent waveplates of a wavelength filter; and different polarizations subsequently lead to different optical path lengths. Hence, there is also Wavelength-Filter-Induced-Dispersion (WFID) that is both chromatic and polarization-related. Therefore, care must be taken to ensure that various dispersion effects are substantially minimized in an optical interleaver.

As fiber-optic systems rapidly spread as the backbone of modern communications networks, there is a need for optical interleavers in which dispersion effects are properly accounted for. The desired optical interleavers should also have a simple and low-cost assembly.

OBJECTS AND ADVANTAGES

Accordingly it is a principal object of the present invention to provide a line of optical interleavers in which a novel beam-swapping element is utilized. Moreover, efforts are painstakingly made in the optical interleavers of the present invention to minimize various dispersion effects. It is a further object of the present invention to provide methods for constructing these novel optical interleavers.

An advantage of the beam-swapping element of the present invention is that it provides an effective and inexpensive alternative to the second polarization rotator and wavelength filter employed in the prior art optical interleaver as shown in FIG. 1, hence rendering a simple and low-cost assembly to an optical interleaver of the present invention. The use of the beam-swapping element further avoids undesirable complications such as dispersion effects. Another significant advantage of the optical interleavers of the present invention is that they present the first kind in the art in which various dispersion effects are substantially minimized. Such characteristics are highly desirable in fiber-optic networks.

These and other objects and advantages will become apparent from the following description and accompanying drawings.

SUMMARY OF THE INVENTION

The present invention provides an optical interleaver comprising a first birefringent element that decomposes and spatially separates an input WDM signal carrying first and second spectral sets into first and second beams with orthogonal polarizations. The first and second spectral sets are substantially complementary. A first wavelength filter, optically coupled to receive the first and second beams, decomposes the first beam into third and fourth beams and the second beam into fifth and sixth beams, by preferentially rotating the polarization of the second (or the first) spectral set in each of the first and second beams by 90-degree. Upon emerging from the first wavelength filter, the third and fifth beams carry the first spectral set with orthogonal polarizations, and the fourth and sixth beams carry the second spectral set with orthogonal polarizations. A second birefringent element, optically coupled to the first wavelength filter, spatially separates the four beams by way of the birefrigent walk-off effect. Upon emerging from the second birefrigent element the four beams are spatially positioned such that they can be construed as travelling along the four corners of an imaginary "rectangular propagation pipe", with the third and fifth beams carrying the first spectral set diagonally opposing each other, and the fourth and sixth beams carrying the second spectral set diagonally opposing each other. A beam-swapping element is optically coupled to receive the third and sixth beams, or the fourth and fifth beams, from the second birefrigent element. Upon passing through the beam-swapping element, the third and fifth beams become positioned such that they can be construed as falling on a first side-plane of the imaginary "rectangular propagation pipe" described above, and the fourth and sixth beams become positioned such that they can be construed as falling on a second side-plane of the imaginary "rectangular propagation pipe", where the first and second side-planes are parallel to each other. The third and fifth beams are then combined into a first output signal carrying the first spectral set, and the fourth and sixth beams are combined into a second output signal carrying the second spectral set, by way of a third birefrigent element. The two output signals may be further directed to two output ports.

The beam-swapping element in the present invention can be in the form of a hexagon plate, or parallelogram plate, comprising first and second faces parallel to third and fourth faces respectively. The four faces are oriented such that when two parallel beams, e.g., the third and sixth beams (or the fourth and fifth beams) in the above embodiment, are incident on the first and second faces, they emerge from the third and fourth faces respectively, thereby "swapping" in position. The beam-swapping element can also be a Dove prism known in the art of optics, where two slanted, non-parallel faces are utilized. As such, when two parallel beams (e.g., the third and fifth beams in the above embodiment) are incident on the first slanted face of a Dove prism, they emerge from the second slanted face in such a way that the two beams remain parallel, however "swapped" in position.

The optical interleaver of the present invention further comprises a compensation assembly, for ensuring that upon being combined various dispersion effects in each and every beam have been substantially minimized. The compensation assembly utilizes various arrangements of optical elements to substantially equalize the optical path lengths of the beams upon being combined. The compensation assembly further advantageously exploits the use of a second wavelength filter to cancel out the dispersion effects the first wavelength filter has inflicted on the beams.

As such, the optical interleaver of the present invention constitutes the first kind in the art in which various dispersion effects are substantially minimized. These dispersion-minimized optical interleavers would be highly desirable in fiber-optic networks. A further advantage of the optical interleavers of the present invention is that routing is accomplished while conserving substantially all optical energy available in the input WDM signal. That is, both the horizontal and vertical polarized components are used and recombined to provide the output signals, resulting very few loss through the optical interleaver.

The optical interleaver of the present invention can be configured to operate as a multiplexer, a de-multiplexer, or a router, as depicted in the drawings and the detailed description that follow.

The novel features of this invention, as well as the invention itself, will be best understood from the following drawings and detailed description.

BRIEF DESCRIPTION OF THE FIGURES

FIG. 1 shows an isometric representation of an optical interleaver according to the prior art;

FIGS. 2A–2D depict isometric representations of several exemplary embodiments of an optical interleaver according to the present invention;

FIGS. 3A–3D show several exemplary embodiments of a "beam-swapping" element according to the present invention;

FIGS. 4A–4C depict isometric representations of three exemplary embodiments of a dispersion-minimized optical interleaver according to the present invention.

FIG. 5 shows a model calculation of phase change as a function of wavelength for four polarization modes emerging from an exemplary embodiment of a wavelength filter;

FIG. 6 shows a model calculation of transmission as a function of wavelength for four polarization modes emerging from an exemplary embodiment of wavelength filter; and FIG. 7 displays transmission as a function of wavelength obtained experimentally from an exemplary embodiment of an optical interleaver according to the present invention.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

FIGS. 2A–2D depict isometric representations of several exemplary embodiments of an optical interleaver 200 according to the present invention. By way of example, FIG. 2A shows a first embodiment of optical interleaver 200 according to the present invention. A WDM signal 500 carrying two distinct and complementary spectral sets 501, 502 in its spectrum enters optical interleaver 200 at an input port 201. As used herein, the term "spectral set" refers to a particular range of wavelengths or frequencies that defines a unique information signal. A first birefrigent element 202 spatially separates WDM signal 500 into horizontally and vertically polarized components, such that a vertically polarized beam 102 travels as an ordinary ray and passes through without changing course, while a horizontally polarized beam 101 travels as an extraordinary beam and consequently walks off from its original course. It should be noted that beams 101 and 102 both comprise the full spectrum of WDM signal 500. A first compensation plate 209 is attached to one side of first birefrigent element 202, so as to intercept second beam 102. The thickness of first compensation plate 209 is selected such that upon traversing though first compensation plate 209, first and second beams 101, 102 have substantially equalized optical path lengths.

A wavelength filter 203, optically coupled to receive first and second beams 101, 102 from first birefrigent element 202, decomposes first beam 101 into a third beam 103 with a horizontal polarization and a fourth beam 104 with a vertical polarization. A wavelength filter 203 also decomposes second beam 102 into a fifth beam 105 with a vertical polarization and a sixth beam 106 with a horizontal polarization. Note that third and fifth beams 103, 105 carry first spectral set 501, whereas fourth and sixth beams 104, 106 carry second spectral set 502. Thus, wavelength filter module 203 separates different spectral sets by way of different polarizations.

A second birefringent element 204 is optically coupled to wavelength filter 203 and spatially separates the four beams into four horizontally and vertically polarized components by way of the birefrigent walk-off effect. Second birefringent element 204 is configured such that vertically polarized beams 104, 105 walk off as extraordinary rays, while horizontally polarized beams 103, 106 pass through without changing course as ordinary rays. Note that upon emerging from second birefrigent element 204 the four beams are spatially positioned such that they can be construed as travelling along the four corners of an imaginary "rectangular propagation pipe", with third and fifth beams 103, 105 carrying the first spectral set diagonally opposing each other, and fourth and sixth beams 104, 106 carrying the second spectral set diagonally opposing each other. The relative positions of the four beams can also be seen in panel 213, which effectively provides a cross-sectional view of the imaginary "rectangular propagation pipe" described above.

A beam-swapping element 205, in the form of a hexagon plate of a refractive material, is optically coupled to receive third and sixth beams 103, 106 from second birefrigent element 204, as a way of example. Box 205E provides a top view of beam-swapping element 205, illustrating the underlying beam-swapping mechanism. Beam-swapping element 205 has first and second faces 205A, 205B parallel to third and fourth faces 205C, 205D respectively. Third and sixth beams 103, 106 are incident on and refracted at first and second faces 205A, 205B. Third and sixth beams 103, 106 are then refracted at and emerge from third and fourth faces 205C, 205D respectively, thereby swapping in position upon emerging. A second compensation plate 210 of a refractive material is optically coupled to receive fourth and fifth beams 104, 105 from second birefrigent element 204. Box 210C provides a top view of second compensation plate 210, illustrating the respective passages of fourth and fifth beams 104, 105. Fourth and fifth beams 104, 105 are incident on a first face 210A and emerge from a second face 210B of second compensation plate 210, where faces 210A, 210B are parallel to each other. As such, upon emerging from beam-swapping element 205 and second compensation plate 210, third and fifth beams 103, 105 become positioned such that they can be construed as falling on a first side-plane of the imaginary "rectangular propagation pipe", and fourth and sixth beams 104, 106 become positioned such that they can be construed as falling on a second side-plane of the imaginary "rectangular propagation pipe", where the first and second side-planes are parallel to each other. The spatial arrangement among the four beams at this point can also be seen in panel 214.

Finally, a third birefirgent element 206 is optically coupled to receive third and sixth beams 103, 106 from beam-swapping element 205, and fourth and fifth beams 104, 105 from second compensation plate 210. Third birefirgent element 206 uses the birefrigent walk-off effect to recombine third and fifth beams 103, 105 into a first output signal 107 carrying the first spectral set 501, and fourth and sixth beams 104, 106 into a second output signal 108 carrying the second spectral set 502. The two output signals may be further directed to two output ports.

Panels 211, 212, 213, 214, and 215 illustrate polarizations, relative positions, and changes in optical path lengths of the beams after passing through each optical element in optical interleaver 200 of FIG. 2A. For instance, after passing through second birefrigent element 204, fifth and fourth beams 105, 104 each acquires an additional optical path length of δ relative to third and sixth beams 103, 106, as shown in panel 213. A length 210L between first and second faces 210A, 210B of second compensation plate 210 is selected to be shorter than a length 215L between first and third faces 205A, 205C (or between second and fourth faces 205B, 205D) of beam-swapping element 205, such that each of fifth and fourth beams 105, 104 gains an extra optical path length of 2δ in reference to third and sixth beams 103, 106, as shown in panel 214. Third birefirgent element 206 is configured in the same way as second birefirgent element 204, such that each of fifth and fourth beams 105, 104 acquires another δ in optical path length, relative to third beam 103 and sixth beam 106. Hence, upon being combined third and fifth beams 103, 105 have substantially equalized optical path lengths, so have fourth and sixth beams 104, 106, as shown in panel 215.

It should be noted hereinafter that in the above embodiment as well as in the succeeding embodiments of the present invention, "horizontal" and "vertical" terms, as conforming to their conventional definitions, are used as a way of example to describe the polarizations of the optical beams in the optical interleavers of the present invention. The use of these terms should not be construed as to limit the scope of the present invention by any measure. For instance, a rotation of optical interleaver 200 in the embodiment of FIG. 2A as a whole about an axis (e.g., the symmetry axis of the imaginary "rectangular propagation pipe" described above) parallel to the direction of propagation of the optical beams will not affect its functional performance, though the polarizations of the optical beams may no longer be described as being "horizontal" and "vertical" after the rotation. What remains being the case is that the four beams emerging from the second birefrigent element continue to be positioned such that they can be construed as travelling along the four corners of an imaginary "rectangular propagation pipe", with the two beams in the same spectral set diagonally opposing each other. The two beams carrying the same spectral set later become positioned on the same side-plane of the imaginary "rectangular propagation pipe" by operation of the beam-swapping element.

FIG. 2B depicts a second embodiment of optical interleaver 200. In this embodiment, first birefrigent element 202, first compensation plate 209, wavelength filter 203, second birefrigent element 204, beam-swapping element 205, and third birefrigent element 206 remain functionally equivalent to those described in the embodiment of FIG. 2A. This embodiment of optical interleaver 200 is substantially equivalent to the embodiment of FIG. 2A in operation. A second compensation plate 220 is configured to provide the same optical path length to fifth beam 105 or fourth beam 104 as beam-swapping element 205 would provide to third beam 103 or sixth beam 106. A half-wave plate 227 is positioned to receive third and sixth beams 103, 106 from beam-swapping element 205, and fourth and fifth beams 104, 105 from second compensation plate 220. Half-wave plate 227 serves to rotate the polarization of each beam by 90-degree. Being vertically polarized, third and sixth beams 103, 106 then traverse as extraordinary rays in third birefrigent element 206 and consequently each acquire an additional optical path length of $\delta$, relative to fifth and fourth beams 105, 104 now traversing as ordinary rays (for being horizontally polarized). As such, third and fifth beams 103, 105 have substantially equalized optical path lengths upon being combined, so have fourth and sixth beams 104, 106. Panels 221, 222, 223, 224, 225 and 226 illustrate polarizations, relative positions, and changes in optical path lengths of the beams after passing through each optical element in this embodiment.

FIG. 2C shows a third embodiment of optical interleaver 200. In this case, first birefrigent element 202, wavelength filter 203, second birefrigent element 204, beam-swapping element 205, and third birefrigent element 206 remain functionally equivalent to those illustrated in the embodiment of FIG. 2A. This embodiment of optical interleaver 200 is substantially equivalent to the embodiment of FIG. 2A in operation. Note that there is no longer a compensation plate attached to first birefrigent element 202. As shown in panel 231, first beam 101 incurs an additional optical path length of $\delta'$ relative to second beam 102 after passing through first birefrigent element 202, owing to the birefrigent walk-off effect. This extra optical path length is subsequently passed onto third and fourth beams 103, 104, as shown in panel 232. As extraordinary rays in second birefrigent element 204, fifth and fourth beams 105, 104 each acquire an extra optical path length of $\delta$ relative to third and sixth beams 103, 106, as shown in panel 233. A second compensation plate 230 is configured to provide an extra optical path length of $(\delta'-2\delta)$ to each of fifth and fourth beams 105, 104, in reference to what beam-swapping element 205 would provide to third and sixth beams 103, 106, as shown in panel 234. A first compensation plate 237 is implemented to receive sixth beam 106 from beam-swapping element 205 and serves to provide an additional optical path length of $2\delta$ to sixth beam 106, as shown in panel 235. Upon passing through third birefrigent element 206, each of fourth and fifth beams 104, 105 traversing as extraordinary rays acquires an additional optical path length of $\delta$, relative to third and sixth beams 103, 106 traversing as ordinary rays. As such, third and fifth beams 103, 105 end up with substantially equalized optical path lengths upon being combined, so do fourth and sixth beams 104, 106, as shown in panel 236.

In the above embodiments of the present invention, the beam-swapping element can be in the form of a refractive hexagon plate, as exemplified in FIGS. 2A–2C, or a refractive parallelogram plate. FIGS. 3A–3B depict top views of a hexagon plate and a parallelogram plate respectively. Each plate has first and second faces 1, 2 parallel to third and fourth faces 3, 4 respectively, such that when two parallel beams $\lambda_1$, $\lambda_2$ are incident on and refracted at faces 1, 2, they are subsequently refracted at and emerge from faces 3, 4 respectively, thereby swapping in position. The beam-swapping plate can alternatively be a Dove prism known in the art of optics, as illustrated in FIG. 3C. In this case, two slanted, non-parallel faces 1, 2 of a Dove prism are utilized, such that when two parallel beams $\lambda_1$, $\lambda_2$ are incident on face 1 they emerge from face 2 and swap in position, due to a combination of refraction and internal reflection as shown in FIG. 3C. Those skilled in the art will recognize that FIGS. 3A–3C provide only a few of many embodiments of a beam-swapping element of the present invention. A skilled artisan can devise a suitable beam-swapping element in accordance with the present invention for a given application.

It should be pointed out that in the embodiments of FIGS. 2A–2C, since the polarizations of third and sixth beams 103, 106 lie in their respective planes of incidence upon entering beam-swapping element 205, it would be preferable for third and sixth beams 103, 106 to be incident at a Brewster angle on first and second faces 205A, 205B (see FIG. 2A) respectively by an appropriate arrangement of beam-swapping element 205, thereby substantially eliminating light refection. In applications where an incidence at a Brewster angle cannot be attained, first and second faces 205A, 205B of beam-swapping element 205 can be coated with an anti-reflection layer, so as to reduce light reflection at these surfaces.

Those skilled in the art will also recognize that the embodiments of FIGS. 2A–2C provide only a few of many embodiments of an optical interleaver according to the present invention. Many alterations/substitutions can be implemented, without departing from the principle and scope of the present invention. For instance, the beam-swapping element can be alternatively coupled to receive fourth and fifth beams 104, 105, and the second compensation plate optically coupled to receive third and fourth beams 103, 106 from second birefrigent element 204 in the embodiment of FIG. 2A, with the optical path lengths provided by the beam-swapping element and second compensation plate being exchanged as well (that is, lengths 215L, 210L exchange their respective values.) A similar exchange between the beam-swapping element and second compensation plate along with appropriate arrangements for compensating for optical path lengths can also be implemented in the embodiments of FIGS. 2B–2C. (Note that for the purpose of eliminating light reflection, it is preferable for the beam-swapping element to be optically coupled to the beams that are polarized in their planes of incidence, as explained above.) Moreover, first compensation element 209 in the embodiments of FIGS. 2A–2B can be alternatively attached to wavelength filter 203, or second birefrigent element 204, to provide additional optical path lengths to fifth and fourth beams 105, 104, such that all four beams have substantially equalized optical path lengths upon emerging from wavelength filter 203 or second birefrigent element 204. Additionally, the combined function of a plurality of compensation plates and/or a half-wave plate in the embodiments of FIG. 2A–2C can be provided by a single compensation element configured to provide different optical path lengths to different beams traversing through it. FIG. 3D illustrates an exemplary embodiment of such a compensation element, comprising first face 1 parallel to second and third faces 2, 3 respectively. A length L-1 between first and second faces 1, 2 is configured to be different from a length L-2 between first and third faces 1, 3, so as to impart different optical path lengths to two beams $\lambda_1$, $\lambda_2$ traversing through it. As a way of example, this exemplary compensation element can be implemented in the embodiment of FIG. 2A to substitute for the combined function of first and second compensation plates 209, 210 and optically coupled to receive fourth and fifth 104, 105 beams, whereas beam-swapping element 205 receives third and sixth beams 103, 106 from second birefrigent element 204. In this case, L-1 should he shorter than length 215L of beam-swapping plate 205 (see FIG. 2A) such that sixth beam 106 acquires an additional optical path length of $(2\delta+\delta')$ relative to fourth beam 104. Likewise, L-2 should be shorter than length 215L of beam-swapping plate 205, such that third beam 103 acquires an additional optical path length of $(2\delta-\delta')$ relative to fifth beam 105. As such, third and fifth beams 103, 105 end up with substantially equalized optical path lengths upon being combined, so do fourth and sixth beams 104, 106, as in the previous embodiments.

FIG. 2D shows a fourth embodiment of optical interleaver 200, illustrating yet another mechanism for beam-swapping and optical-path-length compensation. In this embodiment, first birefrigent element 202, wavelength filter 203, second an third birefrigent elements 204, 206 remain functionally equivalent to those illustrated in the embodiment of FIG. 2A. This embodiment of optical interleaver 200 is substantially equivalent to the embodiment of FIG. 2A in operation. Note that there is no longer a compensation plate attached to first birefrigent element 202. As in the embodiment of FIG. 2A, upon emerging from second birefrigent elements 204 third, fourth, fifth and sixth beams 103, 104, 105, 106 are spatially positioned such that they can be construed as travelling along the four corners of an imaginary "rectangular propagation pipe", with third and fifth beams 103, 105 carrying the first spectral set diagonally opposing each other, and fourth and sixth beams 104, 106 carrying the second spectral set diagonally opposing each other. The relative positions of the four beams can also be seen in panel 243, which effectively provides a cross-sectional view of the imaginary "rectangular propagation pipe" described above. A first half-wave plate module 248 is optically coupled to receive third, fourth, fifth, and sixth beams 103, 104, 105, 106 from second birefrigent elements 204 and selectively rotate the polarizations of third, fourth and fifth beam 103, 104, 105 by 90-degree respectively. A beam-swapping element 249, in the form of a birefrigent plate, is optically coupled to receive third and sixth beams 103, 106 from half-wave plate module 248, wherein third beam 103 walks through as an ordinary ray while sixth beam 106 walks off as an extraordinary ray. Hence, upon emerging from beam-swapping element 249, sixth beam 106 has switched from one side to the other opposing side of third beam 103. Box 249A provides a top view of beam-swapping element 249, illustrating how third and sixth beams 103, 106 swap in position. Contemporaneously, a compensation plate 250, in the form of a refractive parallel plate, is optically coupled to receive fourth and fifth beams 104, 105 from second birefrigent elements 204. Compensation plate 250 is positioned such that upon emerging fifth beam 105 becomes positioned on the same (first) side-plane of the imaginary "rectangular propagation pipe" as third beam 103, and fourth beam 104 becomes positioned on the same (second) side-plane of the imaginary "rectangular propagation pipe" as sixth beam 106, where the two (first and second) side-planes are parallel. (Note that at this point the imaginary "rectangular propagation pipe" construed above for describing the propagation of the four beams is shifted to some extent along a direction perpendicular to the direction of propagation of the beams.) Box 250A provides a top view of compensation plate 250, illustrating the respective passages of fourth and fifth beams 104, 105. The relative (spatial) positions of the four beams at this point can also be seen in panel 245.

A second half-wave plate module 251 is optically coupled to receive third and sixth beams 103, 106 from beam-swapping element 249 and fourth and fifth beams 104, 105 from compensation plate 250, serving to selectively rotate the polarization of sixth beam 106 by 90-degree. Being vertically polarized, third and sixth beams 103, 106 subsequently walk off as extraordinary rays in third birefrigent elements 206, whereas fourth and fifth beams 104, 105, being horizontally polarized, walk through third birefrigent elements 206 as ordinary rays. As such, upon emerging from third birefrigent elements 206, third and fifth beams 103, 105 are spatially combined into a first output signal 107, and fourth and sixth beams 104, 106 are likewise combined into a second output signal 108.

Panels 241, 242, 243, 244, 245 246, and 247 illustrate polarizations, relative (spatial) positions, and changes in optical path lengths of the beams after passing through each optical element in the embodiment of FIG. 2D. As shown in panel 241, first beam 101 incurs an additional optical path length of $\delta'$ relative to second beam 102 after passing through first birefrigent element 202, owing to the birefrigent walk-off effect. This extra optical path length is subsequently passed onto third and fourth beams 103, 104, as shown in panels 242. After passing through second birefrigent element 204, fourth and fifth beams 104, 105 each acquire an extra optical path length of $\delta$ relative to third and sixth beams 103, 106 respectively, as shown in panel 243. Sixth beam 106 gains an extra optical path length of $2\delta'$, relative to third beam 103, from traversing as an extraordinary ray through beam-swapping element 249; whereas compensation plate 250 is configured to provide an extra optical path length of $\delta'$ to each of fourth and fifth beams 104, 105, as shown in panel 245. Upon passing through third birefrigent element 206, each of third and sixth beams 103, 106 traversing as extraordinary rays acquires an additional optical path length of $\delta$, in reference to fifth and fourth beams 105, 104 traversing as ordinary rays. As such, third and fifth beams 103, 105 have substantially equalized optical path lengths upon being combined, so have fourth and sixth beams 104, 106.

It will be clear to those skilled in the art that there are a variety of ways to compensate for the optical path lengths of the optical beams in an optical interleaver of the present invention, A skilled artisan will know how to implement appropriate compensation elements to best suit a given application.

In the embodiments of FIGS. 2A–2D, each of first, second, and third birefrigent elements 202, 204, 206 generally comprises a birefrigent material, such as calcite, rutile, lithium niobate, or a $YVO_4$ based crystal. Wavelength filter 203 is typically made of a stacked plurality of birefrigent waveplates with each waveplate oriented in a predetermined direction with a predetermined length, so as to pass a selected set of wavelengths with a horizontal polarization and a complimentary set of wavelengths with a vertical polarization. For wavelength demultiplexing applications, the wavelength filter usually has a comb filter response curve with substantially flat top or square wave spectral response.

Because of the way a birefrigent wavelength filter is typically configured, different wavelengths of light undertake different polarizations in various constituent waveplates of a wavelength filter, and different polarizations subsequently lead to different optical path lengths, hence resulting in dispersion that is both chromatic and polarization-related. This wavelength-filter-induced-dispersion has not been accounted for in prior art optical interleavers, such as the optical interleaver described in FIG. 1. The following presents a treatment of dispersion effects induced by a birefrigent wavelength filter by way of Jones matrix analysis.

Jones matrices are widely used to represent the effects of optical elements on polarized light. For a birefrigent waveplate with an optical axis oriented along x-axis, the representative Jones matrix is given by:

$$\text{Jones Matrix} = e^{-i\phi} \cdot \begin{bmatrix} e^{-i\varphi} & 0 \\ 0 & e^{i\varphi} \end{bmatrix} \quad (1)$$

where $$\phi = k_0 z \cdot \left(\frac{n_e + n_0}{2}\right), \varphi = k_0 z \cdot \left(\frac{n_e - n_0}{2}\right), k_0 = \frac{2\pi}{\lambda}.$$

Here, $n_e$ and $n_o$ are refractive indices of e-ray and o-ray of the birefringent waveplate respectively, z is the thickness of the waveplate, and $\lambda$ is the wavelength of light.

For a birefrigent waveplate with an optical axis oriented at an angle $\theta$ with respect to the x-axis, the corresponding Jones matrix can be expressed as:

$$\text{Jones Matrix} = e^{-i\phi} \begin{bmatrix} \cos\theta & -\sin\theta \\ \sin\theta & \cos\theta \end{bmatrix} \begin{bmatrix} e^{-i\varphi} & 0 \\ 0 & e^{i\varphi} \end{bmatrix} \begin{bmatrix} \cos\theta & \sin\theta \\ -\sin\theta & \cos\theta \end{bmatrix} \quad (2)$$

$$= e^{-i\phi} \begin{bmatrix} \cos\varphi - i\sin\varphi\cos2\theta & -i\sin2\theta\sin\varphi \\ -i\sin2\theta\sin\varphi & \cos\varphi + i\sin\varphi\cos2\theta \end{bmatrix}$$

The above matrix can be generalized in the form of $$\text{Jones Matrix} = \begin{bmatrix} a - ib & c + id \\ -c + id & a + ib \end{bmatrix} \quad (3)$$

where a, b, c, and d are real numbers, each being a function of the wavelength of light, the polarization of light with respective to the optical axis of the waveplate, as well as the characteristics of the waveplate, as indicated in (2).

It can be further shown that a multiplication of two or more Jones matrices, each being of the form displayed in (3), yields a matrix of the same form as shown in (3).

Since a birefrigent wavelength filter typically comprises a plurality of multiple-order waveplates with their optical axes oriented at various angles, the Cones matrix of the entire wavelength filter is consequently a multiplication of the Jones matrices of the constituent waveplates. Hence, the Jones matrix of a wavelength filter is also of the form shown in (3).

As a way of example, let an incident beam polarized in the x direction be represented by a vector $$\begin{bmatrix} 1 \\ 0 \end{bmatrix},$$

where the incident beam comprises two wavelengths $\lambda_1$ and $\lambda_2$. Upon passing through a birefringent wavelength filter, the output beam is given by $$\begin{bmatrix} a_t - ib_t & c_t + id_t \\ -c_t + id_t & a_t + ib_t \end{bmatrix} \cdot \begin{bmatrix} 1 \\ 0 \end{bmatrix} = \begin{bmatrix} a_t - ib_t \\ -c_t + id_t \end{bmatrix} = \begin{bmatrix} Hx \\ Hy \end{bmatrix} \quad (4)$$

where the matrix on the left-hand side represents the Jones matrix for the entire wavelength filter (hence the subscript "t" is employed to denote this effect), given by a multiplication of the Jones matrices of the constituent waveplates of the wavelength filter. Suppose that the wavelength filter is configured to selectively rotate the polarization of the second wavelength $\lambda_2$ by 90-degree and leave the polarization of the first wavelength $\lambda_1$ unchanged. In the output beam, therefore, the horizontally polarized component Hx carries the first wavelength $\lambda_1$ and the vertically polarized component He carries the second wavelength $\lambda_2$.

Similarly, let an incident light seam polarized in the y direction be represented by a vector $$\begin{bmatrix} 0 \\ 1 \end{bmatrix},$$

where the incident beam comprise two wavelengths $\lambda_1$ and $\lambda_2$. Upon passing through the same birefrigent wavelength filter presented above, the output beam is given by $$\begin{bmatrix} a_t - ib_t & c_t + id_t \\ -c_t + id_t & a_t + ib_t \end{bmatrix} \cdot \begin{bmatrix} 0 \\ 1 \end{bmatrix} = \begin{bmatrix} c_t + id_t \\ a_t + ib_t \end{bmatrix} = \begin{bmatrix} Vx \\ Vy \end{bmatrix} \quad (5)$$

In this case, the horizontally polarized component Vx carries the second wavelength $\lambda_2$, and the vertically polarized component Vy carries the first wavelength $\lambda_1$.

An important result from the above analysis is that the phase of Hx is given by $[-\tan^{-1}(b_t/a_t)]$, whereas the phase of Vy is $\tan^{-1}(b_t/a_t)$. And the amplitude of these two components is the same, given by $\sqrt{a_t^2 + b_t^2}$. That is to say that upon emerging from the wavelength filter, the two components carrying the first wavelength $\lambda_1$ (whose polarizations are unaltered with respect to their respective incident beams) incur additional phases (with respect to their respective incident beams) that are opposite in sign and equal in magnitude, while retaining the same amplitude. Likewise, the two components carrying the second wavelength $\lambda_2$ i.e., He and Vx (whose polarizations are rotated by 90-degree with respect to their respective incident beams), also incur additional phases (with respect to their respective incident beams) that are opposite in sign and equal in magnitude, while retaining the same amplitude.

As a way of example, FIG. 5 displays the phase of each of Hx, He, Vx, and Vy as a function of wavelength, and FIG. 6 displays the transmission (proportional to the (amplitude)$^2$) of each of Hx, He, Vx, and Vy as a function of wavelength, calculated for an exemplary embodiment of a wavelength filter using the Jones matrix analysis presented above. The exemplary wavelength filter comprises two waveplates, where the first waveplate is about 900$^{th}$ order with its optical axis oriented at 45 degrees with respect to the x-axis and the second waveplate is about 1800$^{th}$ order with its optical axis oriented at (−15) degrees with respect to the x-axis. These graphs clearly demonstrate that the phases of the two components carrying the same wavelength, either Hx and Vy, or He and Vx, are opposite in sign and equal in magnitude, while retaining the same amplitude (and therefore transmission) within the wavelength range being considered.

Based on the analysis along with the model calculation described above, one can infer that if a beam of light characterized by a wavelength λ enters a first wavelength filter with a horizontal polarization and subsequently enters a second wavelength filter with a vertical polarization, where the first and second wavelength filters are configured to be functionally equivalent, the net phase change the light beam would incur from passing through the two wavelength filters would be zero. That is, the operation of the second wavelength filter in this case effectively cancels out the phase change the first wavelength filter has imparted on the beam. This is the case, irrespective of whether the polarization of the beam is being rotated by the wavelength filters. This finding can also be applied to a beam of light carrying a particular range of wavelengths, where the phase change each component of wavelength incurs from the first wavelength filter is subsequently cancelled out by the working of the second wavelength filter.

As used herein in this specification and appending claims, the phase change (or time delay) a light beam incurs upon passing through a wavelength filter is termed "Wavelength-Filter-Induced-Dispersion" (WFID).

In light of the above discussion, efforts must be made to compensate for WFID arising from wavelength filters employed in an optical interleaver, in addition to compensating for the dispersion effects resulted from traversing different optical path lengths in other optical elements of the optical interleaver. It should be noted in the prior art optical interleaver shown in FIG. 1, as disclosed in U.S. Pat. No. 5,694,233, each of two polarization modes 107, 108 in the first spectral set ends up with a net zero of WFID from passing through wavelength filters 61, 62, since they enter first wavelength filter 61 as being horizontally polarized while subsequently entering second wavelength filter 62 as being vertically polarized. However, each of two polarization modes 109, 110 in the second spectral set nonetheless gains a non-zero WFID upon passing through wavelength filters 61, 62, since they enter both first and second wavelength filter 61, 62 as being horizontally polarized. And this non-zero WFID remains being uncompensated for when the beams being combined.

FIGS. 4A–4C show several exemplary embodiments of an optical interleaver 400 of the present invention, in which efforts are painstakingly made to compensate for various dispersion effects. By way of example, FIG. 4A shows a first embodiment of optical interleaver 400 according to the present invention. A WDM signal 500 carrying two distinct spectral sets 501, 502 in its spectrum enters optical interleaver 400 at an input port 401. As used above, the term "spectral set" refers to a particular range of wavelengths or frequencies that defines a unique information signal. A first birefrigent element 402 spatially separates WDM signal 500 into horizontally and vertically polarized components, such that a vertically polarized component 102 travels as an ordinary ray and passes through without changing course, while a horizontally polarized component 101 travels as an extraordinary ray and consequently walks off from its original course. It should be noted that first and second beams 101 and 102 both comprise the full spectrum of WDM signal 500. A first compensation plate 409 is attached to one side of first birefrigent element 402, so as to intercept second beam 102. The thickness of first compensation plate 409 is selected such that upon passing through first birefrigent element 402 along with first compensation plate 409, first and second beams 101, 102 have substantially equalized optical path lengths.

A first wavelength filter 403 is optically coupled to receive first and second beams 101, 102 from first birefrigent element 402 along with first compensation plate 409. First wavelength filter 403 decomposes first beam 101 into a third beam 103 with a horizontal polarization and a fourth beam 104 with a vertical polarization, and second beam 102 into a fifth beam 105 with a vertical polarization and a sixth beam 106 with a horizontal polarization. Note that the end effect of first wavelength filter 403 is to change the polarization of the second spectral set signal in first beam 101 from being horizontal to vertical and the polarization of the second spectral set signal in second beam 102 from being vertical to horizontal, while leaving the polarizations of the first spectral set signals in both first and second beams 101, 102 unaltered. As such, third and fifth beams 103, 105 carry first spectral set 501, while fourth and sixth beams 104, 106 carry second spectral set 502.

A second birefringent element 404 is optically coupled to first wavelength filter 403 and spatially separates the four beams into four horizontally and vertically polarized components by way of the birefrigent walk-off effect. It is configured such that vertically polarized beams 104, 105 walk off as extraordinary rays while horizontally polarized beams 103, 106 pass through without changing course as ordinary rays. Note that upon emerging from second birefrigent element 404 the four beams are spatially positioned such that they can be construed as travelling along the four corners of an imaginary "rectangular propagation pipe", with third and fifth beams 103, 105 carrying the first spectral set diagonally opposing each other, and fourth and sixth beams 104, 106 carrying the second spectral set diagonally opposing each other. The relative positions of the four beams can also be seen in panel 415, which effectively provides a cross-sectional view of the imaginary "rectangular propagation pipe" described above.

A beam-swapping element 405, in the form of a refractive hexagon plate, is optically coupled to receive third and sixth beams 103, 106 from second birefrigent element 404, as a way of example. Box 405E provides a top view of beam-swapping element 405, illustrating the underlying beam-swapping mechanism. Beam-swapping element 405 has first and second faces 405A, 405B parallel to third and fourth faces 405C, 405D respectively. Third and sixth beams 103, 106 are incident on and refracted at first and second faces 405A, 405B. Third and sixth beams 103, 106 are subsequently refracted at and emerge from third and fourth faces 405C, 405D respectively, thereby swapping in position upon emerging. A second refractive compensation plate 410 is optically coupled to receive fourth and fifth beams 104, 105 from second birefrigent element 404. Box 410C provides a top view of second compensation plate 410, illustrating the respective passages of fourth and fifth beams 104, 105. Fourth and fifth beams 104, 105 are incident on a first face 410A and emerge from a second face 410B of second compensation plate 410, where faces 410A, 410B are parallel to each other. As such, upon emerging from beam-swapping element 405 and second compensation plate 410, third and fifth beams 103, 105 become positioned such that they can be construed as falling on a first side-plane of the imaginary "rectangular propagation pipe", and fourth and sixth beams 104, 106 become positioned such that they can be construed as falling on a second side-plane of the imaginary "rectangular propagation pipe", where the first and second side-planes are parallel to each other. The spatial arrangement among the four beams at this point can also be seen in panel 416. Note that in this case, second compensation plate 410 is configured to provide the same optical path length to each of fifth and fourth beams 105, 104 as beam-swapping element 405 would provide to each of third and sixth beams 103, 106.

A half-wave plate module 406 is optically coupled to receive third and sixth beams 103, 106 from beam-swapping element 405, and fourth and fifth beams 104, 105 from second compensation plate 410. Half-wave plate module 406 is configured to selectively rotate the polarizations of third and fifth beams 103, 105 by 90-degree respectively and leave the polarizations of fourth and sixth beams 104, 106 unchanged. Hence, upon emerging from half-wave plate module 406, third and fourth beams 103, 104, now diagonally opposing each other in position, are vertically polarized; and sixth and fifth beams 106, 105, diagonally opposing each other in position, are horizontally polarized, as shown in panel 417.

A second wavelength filter 407 is optically coupled to receive third, fourth, fifth and sixth beams 103, 104, 105, 106 from half-wave plate module 406. Second wavelength filter 407 is configured in the same way as first wavelength filter 403, serving to rotate the polarizations of fourth and sixth beams 104, 106 by 90-degree respectively, while leaving the polarizations of third and fifth beams 103, 105 unchanged.

Since fourth and sixth beams 104, 106 enter first wavelength filter 403 as being horizontally and vertically polarized respectively, and subsequently enter second wavelength filter 407 as being vertically and horizontally polarized respectively by contrast, each of fourth and sixth beams 104, 106 ends up with a net zero of WFID after passing through second wavelength filter 407. Moreover, because of the work of half-wave plate module 406, third and fifth beams 103, 105 enter second wavelength filter 407 being vertically and horizontally polarized respectively, as opposed to being horizontally and vertically polarized upon entering first wavelength filter 403. Hence, each of third and fifth beams 103, 105 incurs no net WFID after passing through second wavelength filter 407, either. As such, the operation of second wavelength filter 407 effectively "undoes" whatever dispersion effects first wavelength filter 403 has inflicted onto the beams, thereby canceling out any WFID these beams have incurred from traversing through first wavelength filter 403.

Finally, a third birefrigent element 408 is optically coupled to receive third, fourth, fifth and sixth beams 103, 104, 105, 106 from second wavelength filter 407. Third birefrigent element 408 spatially combined third and fifth beams 103, 105 into a first output signal 107 carrying first spectral set 501, and fourth and sixth beams 104, 106 into a second output signal 108 carrying second spectral set 502. Note that third and sixth beams 103, 106 now walk off as extraordinary rays in third birefrigent element 408, in contrast to being ordinary rays in second birefrigent element 404. Hence, by configuring second and third birefrigent elements 404, 408 in a functionally equivalent way, third and fifth beams 103, 105 end up with substantially equalized optical path lengths, so do fourth and sixth beams 104, 106, upon being combined. First and second output signals 107, 108 are further directed to an output port 411 by way of a roof prism 412.

Panels 413, 414, 415, 416, 417, 418, and 419 depict the polarizations and relative (spatial) positions of the light beams after passing through each optical element in the embodiment of FIG. 4A.

FIG. 4B shows a second embodiment of optical interleaver 400. In this embodiment, first birefrigent element 402, first compensation plate 409, first wavelength filter 403, second birefrigent element 404, beam-swapping element 405, second compensation plate 410, second wavelength filter 407, and third birefrigent element 408 remain functionally equivalent to those described in the embodiment of FIG. 4A. A half-wave plate assembly, comprising two half-wave plates 451, 452 diagonally opposing each other in position, is attached to second birefrigent element 404 and serves to rotate the polarizations of third and fifth beams 103, 105 by 90-degree respectively. After emerging from second birefrigent element 404 along with half-wave plates 451, 452, third and sixth beams 103, 106 are subsequently swapped in position by way of beam-swapping element 405, while fourth and fifth beam pass through second compensation plate 410 in their original courses. As such, upon entering second wavelength filter 403, the polarizations and relative (spatial) positions of third, fourth, fifth and sixth beams 103, 104, 105, 106 become the same as in the embodiment of FIG. 4A, so is the rest of operation.

Panels 453, 454, 455, 456, 457, 458, and 459 illustrate the polarizations and relative positions of the light beams after passing through each optical element in the embodiment of FIG. 4B.

FIG. 4C shows a third embodiment of optical interleaver 400. In this embodiment, first birefrigent element 402, first compensation plate 409, first wavelength filter 403, second birefrigent element 404, beam-swapping element 405, second compensation plate 410, and third birefrigent element 408 remain operationally equivalent to those described in the embodiment of FIG. 4A. A half-wave assembly, comprising two half-wave plates 451, 452 diagonally opposing each other, is also attached to second birefrigent element 404 and serves to rotate the polarizations of third and fifth beams 103, 105 by 90-degree respectively. Second wavelength filter 407 in this case is optically coupled to receive third, fourth, fifth and sixth beams 103, 104, 105, 106 from second birefrigent element 404 along with half-wave plates 451, 452. Second wavelength filter 407 selectively rotates the polarizations of fourth and sixth beams 104, 106 by 90-degree respectively, while leaving the polarizations of third and fifth beams 103, 105 unaltered. Notice that because of the way half-wave plates 451, 452 are spatially arranged, third, fourth, fifth and sixth beams 103, 104, 105, 106 enter second wavelength filter 407 with the same polarizations as they do respectively in the embodiment of FIG. 4A. Hence, the operation of second wavelength filter 407 also effectively "undoes" what first wavelength filter 403 has inflicted onto these beams, thereby canceling out any WFID these beams have incurred from passing through first wavelength filter 403.

Beam-swapping element 405 is optically coupled to receive fourth and fifth beams 104, 105 from second wavelength filter 407 and swap the two beams in position. Second compensation plate 410 is optically coupled to receive third and sixth beams 103, 106 from second wavelength filter 407. Note that by optically coupling beam-swapping element 405 to horizontally polarized fourth and fifth beams 104, 105, an incidence at a Brewster angle can be advantageously exploited for each of fourth and fifth beams 104, 105, so as to reduce slight reflection at the surfaces of beam-swapping element 405. Further note that all four beams incur no relative change in optical path lengths from passing through beam-swapping element 405 and second compensation plate 410, as in the embodiment of FIG. 4A. As such, upon entering third birefrigent element 408, the polarizations, the relative (spatial) positions, and the relative optical path lengths of the four beams become the same as in the embodiment of FIG. 4A or FIG. 4B, so is the remaining operation.

Panels 473, 474, 475, 476, 477, 478, and 479 depict the polarizations and relative positions of the light beams after passing through each optical element in the embodiment of FIG. 4C.

In the embodiments of FIGS. 4A–4C, each of first, second, and third birefrigent elements 402, 404, 408 typically comprises a birefrigent material, such as calcite, rutile, lithium niobate, or a $YVO_4$ based crystal. First and second wavelength filters 403, 407, each generally comprising a stacked plurality of birefrigent waveplates, are configured to be functionally equivalent, for the purposes of minimizing WFID as explained above. The beam-swapping plate can be in the form of a refractive hexagon plate, as exemplified in FIGS. 4A–4C, or in one of other embodiments illustrated in FIGS. 3B–3D. A birefrigent beam-swapping element along with an appropriate compensation plate, analogous to beam-swapping element 249 and compensation plate 250 described in the embodiment of FIG. 2D, can also be implemented with suitable compensation mechanisms designed for equalizing optical path lengths of the beams. A skilled artisan can devise a suitable beam-swapping element in accordance with the present invention for a given application.

As such, the optical interleaver thus described presents the first kind in the art in which various dispersion effects are substantially minimized. That is, not only the two polarization modes in each spectral set have substantially equalized optical path lengths upon being combined, each polarization mode ends up with a net zero of WFID upon exiting the interleaver. Such characteristics are highly desirable in fiber-optic networks. A further advantage of the optical interleavers of the present invention is that routing is accomplished while conserving substantially all optical energy available in the input WDM signal. That is, both the horizontal and vertical polarized components are used and recombined to provide the output signals, resulting very few loss through the interleaver.

To demonstrate the functionality and performance of the optical interleavers of the present invention, FIG. 7 displays a plot of transmission as a function of wavelength obtained experimentally from an exemplary optical interleaver configured according to the embodiment of FIG. 4A of the present invention. Each wavelength filter in this exemplary interleaver comprises two waveplates made of $YVO_4$, where the first waveplate is about $1860^{th}$ order with its optical axis oriented at 45 degrees with respect to the x-axis and the second waveplate is about $3720^{th}$ order with its optical axis oriented at (−15) degrees with respect to the x-axis. The corresponding channel spacing is about 50 GHz. The experimental data shown in FIG. 7 demonstrate the superior performance of the optical interleaver of the present invention, in contrast to the performance of the prior art optical interleavers, such as the one shown FIG. 1.

Optical interleavers as exemplified in the above embodiments operate as de-multiplexers. Multiplexers can also be provided by operating these interleavers in reverse. Furthermore, by suitably controlling the polarization rotation induced by the wavelength filters, these interleavers can be configured to operate as optical routers.

Those skilled in the art will recognize that the exemplary embodiments of optical interleavers depicted above are provided for the illustration purposes, to elucidate the principle and the utility of the present invention. Various alterations and substitutions can be made with departing from the principle and the scope of the present invention. For instance, the first birefrigent element in the above embodiments can be configured such that the first and second beams traverse as ordinary and extraordinary rays respectively. The wavelength filters can be designed to selectively rotate the polarizations of the third and fifth beams carrying the first spectral set by 90-degree respectively, while leaving the polarizations of the fourth and sixth beams carrying the second spectral set unchanged. Moreover, the second birefrigent element can be configured such that the third and sixth beams walk off as extraordinary rays, whereas the fourth and fifth beams walk through as ordinary rays. A similar arrangement can be made accordingly in the third birefrigent element, and so on. Those skilled in the art will appreciate the utility and versatility of the present invention, and design an optical interleaver in accordance with the present invention to best suit a given application.

Those skilled in the art will also recognize that although in the above exemplary embodiments an input WDM signal 500 comprising two spectral sets 501, 502 is used as a way of example to illustrate the functionality and operation of the optical interleavers of the present invention, it should not be construed in any way to limit the utility of the present inventions. That is, the optical interleavers of the present invention can be used to de-multiplex a WDM signal comprising more than two spectral sets, or multiplex two or more spectral sets into a WDM signal. A skilled artisan will know how to can design an optical interleaver in accordance with the present invention suitable for a given application.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. An optical apparatus comprising:

a) a first birefrigent element for receiving a wavelength division multiplexed (WDM) signal and decomposing said WDM signal into a first beam and a second beam that are orthogonally polarized and spatially separated;

b) a first wavelength filter optically coupled to receive said first and second beams from said first birefrigent element, wherein said first wavelength filter decomposes said first beam into third and fourth beams with orthogonal polarizations and said second beam into fifth and sixth beams with orthogonal polarizations, wherein said third and fifth beams carry a first spectral set of wavelengths and said fourth and sixth beams carry a second spectral set of wavelengths, and wherein said first and second spectral sets are substantially complementary;

c) a second birefrigent element optically coupled to receive said third, forth, fifth, and sixth beams from said first wavelength filter, wherein said third, fourth, fifth, and sixth beams are spatially separated into four polarized components, wherein said third, fourth, fifth, and sixth beams are spatially positioned such that they can be construed as traveling along four corners of an imaginary "rectangular propagation pipe", with said third beam positioned diagonally relative to said fifth beam and said fourth beam positioned diagonally relative to said sixth beam;

d) a beam-swapping element optically coupled to receive two or more of said third, fourth, fifth, and sixth beams from said second birefrigent element, wherein upon emerging from said beam-swapping element said third and fifth beams become positioned such that they can be construed as falling on a first side-plane of said imaginary "rectangular propagation pipe", and said fourth and sixth beams become positioned such that they can be construed as falling on a second side-plane of said imaginary "rectangular propagation pipe", and wherein said first and second side-planes are parallel to each other; and e) a third birefrigent element optically coupled to receive said third, forth, fifth, and sixth beams from said beam-swapping element, wherein upon emerging from said third birefrigent element said third and fifth beams are spatially combined into a first output signal carrying said first spectral set, and said fourth and sixth beams are spatially combined into a second output signal carrying said second spectral set.

2. The optical apparatus of claim 1 wherein said beam-swapping element comprises one or more elements selected from the group consisting of hexagon plates, parallelogram plates, Dove prisms, and birefrigent plates.

3. The optical apparatus of claim 2 wherein said beam-swapping element comprises first and second faces parallel to third and fourth faces respectively.

4. The optical apparatus of claim 3 wherein said third and sixth beams are incident on said first and second faces and emerge from said third and fourth faces respectively, whereby upon merging said third and fifth beams become positioned on said first side-plane, and said fourth and sixth beams become positioned on said second side-plane.

5. The optical apparatus of claim 4 wherein said third beam is incident on said first face at a first Brewster angle and said sixth beam is incident on said second face at a second Brewster angle.

6. The optical apparatus of claim 3 wherein said fourth and fifth beams are incident on said first and second faces and emerge from said third and fourth faces respectively, whereby said third and fifth beams become positioned on said first side-plane and said fourth and sixth beams become positioned on said second side-plane.

7. The optical apparatus of claim 6 wherein said fourth beam is incident on said first face at a first Brewster angle and said fifth beam is incident on said second face at a second Brewster angle.

8. The optical apparatus of claim 3 wherein each of said first and second faces comprises an anti-reflection coating, so as to substantially reduce light reflection at said first and second faces.

9. The optical apparatus of claim 2 wherein said beam-swapping element is a Dove prism comprising first and second faces, wherein said first and second faces are not parallel.

10. The optical apparatus of claim 9 wherein said third and sixth beams are incident on said first face in such a way that upon emerging from said second face said third and fifth beams become positioned on said first side-plane, and said fourth and sixth beams become positioned on said second side-plane.

11. The optical apparatus of claim 9 wherein said fourth and fifth beams are incident on said first face in such a way that upon emerging from said second face said third and fifth beams are positioned on said first side-plane, and said fourth and sixth beams are positioned on said second side-plane.

12. The optical apparatus of claim 9 wherein said first face comprises an anti-reflection coating, so as to substantially reduce light reflection at said first face.

13. The optical apparatus of claim 2 wherein said beam-swapping element comprises:

a) a first half-wave plate module optically coupled to receive said third, fourth, fifth and sixth beams from said second birefrigent element and serving to selectively rotate the polarizations of said third, fourth and fifth beams by 90-degree respectively;

b) a birefrigent plate optically coupled to receive said third and sixth beams from said first half-wave plate module, whereby said third beam continues its course of propagation whereas said sixth beam walks off from its original course of propagation;

c) a parallel plate optically coupled to receive said fourth and fifth beams from first half-wave plate module, wherein said parallel plate is oriented such that upon emerging said fifth beam is positioned on said first side-plane along with said third beam emerging from said birefrigent plate, and said fourth beam is positioned on said second side-plane along with said sixth beam emerging from said birefrigent element; and d) a second half-wave plate module optically coupled to receive said third and sixth beams from said birefrigent plate and said fourth and fifth beams from said parallel plate, wherein said second half-wave plate module selectively rotates the polarization of said sixth beam by 90-degree.

14. The optical apparatus of claim 1 further comprising a compensation assembly for substantially minimizing dispersion effects in said third, fourth, fifth, and sixth beams.

15. The optical apparatus of claim 14 wherein said compensation assembly comprises a compensation plate optically coupled to receive said fourth and fifth beams from said second birefrigent element, wherein said beam-swapping element is optically coupled to receive said third and sixth beams from said second birefrigent element, wherein said compensation plate comprises a first face parallel to second and third faces respectively, wherein said fourth and fifth beams are incident on said first face and emerge from said second and third faces respectively, and wherein a first length between said first and second faces and a second length between said first and third faces are chosen to ensure that upon being combined said third and fifth beams have substantially equalized optical path lengths, and said fourth and sixth beams have substantially equalized optical path lengths.

16. The optical apparatus of claim 14 wherein said compensation assembly comprises a compensation plate optically coupled to receive said third and sixth beams from said second birefrigent element, wherein said beam-swapping element is optically coupled to receive said fourth and fifth beams from said second birefrigent element, wherein said compensation plate comprises a first face parallel to second and third faces respectively, wherein said third and sixth beams are incident on said first face and emerge from said second and third faces respectively, and wherein a first length between said first and second faces and a second length between said first and third faces are chosen to ensure that upon being combined said third and fifth beams have substantially equalized optical path lengths, and said fourth and sixth beams have substantially equalized optical path lengths.

17. The optical apparatus of claim 14 wherein said compensation assembly comprises first and second compensation plates, wherein said first compensation plate is optically coupled to receive said second beam from said first birefrigent element, such that upon being incident on said first wavelength filter said first and second beams have substantially equalized optical path lengths, wherein said second compensation plate is disposed between and optically coupled to said second and third birefrigent elements, for ensuing that upon being combined said third and fifth beams have substantially equalized optical path lengths and said fourth and sixth beams have substantially equalized optical path lengths.

18. The optical apparatus of claim 17 wherein said beam-swapping element comprises first and second faces parallel to third and fourth faces, and said second compensation plate comprises a fifth face parallel to a sixth face, wherein said third and sixth beams from said second birefrigent element are incident on said first and second faces and emerge from said third and fourth faces respectively, wherein said fourth and fifth beams from said second birefrigent element are incident on said fifth face and emerge from said sixth face, and wherein a first length between said first and third faces and a second length between said fifth and sixth faces are so chosen to ensure that upon being combined said third and fifth beams have substantially equalized optical path lengths, and said fourth and sixth beams have substantially equalized optical path lengths.

19. The optical apparatus of claim 18 wherein said first and second lengths are substantially equal, wherein said optical apparatus further comprises a half-wave plate module optically coupled to receive said third and sixth beams from said beam-swapping element and said fourth and fifth beams from said second compensation plate, and wherein said half-wave plate module rotates the polarizations of said third, fourth, fifth and sixth beams by 90-degree respectively.

20. The optical apparatus of claim 18 wherein third beam is incident on said first face at a first Brewster angle and said sixth beam is incident on said second face at a second Brewster angle.

21. The optical apparatus of claim 17 wherein said beam-swapping element comprises first and second faces parallel to third and fourth faces, and said second compensation plate comprises a fifth face parallel to a sixth face, wherein said fourth and fifth beams from said second birefrigent element are incident on said first and second faces and emerge from said third and fourth faces respectively, wherein said third and sixth beams from said second birefrigent element are incident on said fifth face and emerge from said sixth face, and wherein a first length between said first and third faces and a second length between said fifth and sixth faces are chosen to ensure that upon being combined said third and fifth beams have substantially equalized optical path lengths, and said fourth and sixth beams have substantially equalized optical path lengths.

22. The optical apparatus of claim 21 wherein said first and second lengths are substantially equal, wherein said optical apparatus further comprises a half-wave plate module optically coupled to receive said fourth and fifth beams from said beam-swapping element and said third and sixth beams from said second compensation plate, and wherein said half-wave plate module rotates the polarizations of said third, fourth, fifth and sixth beams by 90-degree respectively.

23. The optical apparatus of claim 21 wherein said fourth beam is incident on said first face at a first Brewster angle and said fifth beam is incident on said second face at a second Brewster angle.

24. The optical apparatus of claim 14 wherein said compensation assembly comprises first and second compensation plates disposed between said second and third birefrigent elements, for ensuing that upon being combined said third and fifth beams have substantially equalized optical path lengths, and said fourth and sixth beams have substantially equalized optical path lengths.

25. The optical apparatus of claim 24 wherein said beam-swapping element comprises first and second faces parallel to third and fourth faces, and said first compensation plate comprises a fifth face parallel to a sixth face, wherein said third and sixth beams from said second birefrigent element are incident on said first and second faces and emerge from said third and fourth faces respectively, wherein said fourth and fifth beams from said second birefrigent element are incident on said fifth face and emerge from said sixth face, wherein said second compensation plate is optically coupled to receive said sixth beam from said beam-swapping element, and wherein a first length between said first and third faces, a second length between said fifth and sixth faces, and a thickness of said second compensation plate are so chosen to ensure that upon being combined said third and fifth beams have substantially equalized optical path lengths, and said fourth and sixth beams have substantially equalized optical path lengths.

26. The optical apparatus of claim 25 wherein third beam is incident on said first face at a first Brewster angle and said sixth beam is incident on said second face at a second Brewster angle.

27. The optical apparatus of claim 24 wherein said beam-swapping element comprises first and second faces parallel to third and fourth faces, and said first compensation plate comprises a fifth face parallel to a sixth face, wherein said fourth and fifth beams from said second birefrigent element are incident on said first and second faces and emerge from said third and fourth faces respectively, wherein said third and sixth beams from said second birefrigent element are incident on said fifth face and emerge from said sixth face, wherein said second compensation plate is optically coupled to receive said sixth beam from said first compensation plate, and wherein a first length between said first and third faces, a second length between said fifth and sixth faces, and a thickness of said second compensation plate are chosen to ensure that upon being combined said third and fifth beams have substantially equalized optical path lengths, and said fourth and sixth beams have substantially equalized optical path lengths.

28. The optical apparatus of claim 14 wherein said compensation assembly comprises first and second compensation plates, a half-wave plate module, and a second wavelength filter, wherein said first compensation plate is optically coupled to receive said second beam from said first birefrigent element, such that upon being incident on said first wavelength filter said first and second beams have substantially equalized optical path lengths, wherein said second compensation plate, said half-wave plate module and said second wavelength filter are disposed between said second and third birefrigent elements, and wherein said first and second wavelength filters are configured to ensure that upon being combined wavelength-filter-induced-dispersion (WFID) is substantially cancelled out for each of said third, fourth, fifth and sixth beams.

29. The optical apparatus of claim 28 wherein said beam-swapping element comprises first and second faces parallel to third and fourth faces, and said second compensation plate comprises a fifth face parallel to a sixth face, wherein said third and sixth beams from said second birefrigent element are incident on said first and second faces and emerge from said third and fourth faces respectively, wherein said fourth and fifth beams from said second birefrigent element are incident on said fifth face and emerge from said sixth face, wherein said half-wave plate module is optically coupled to receive said third and sixth beams from said beam-swapping element and said fourth and fifth beams from said second compensation plate, serving to selectively rotate the polarizations of said third and fifth beams by 90-degree respectively, wherein said second wavelength filter is optically coupled to receive said third, fourth, fifth and sixth beams from said half-wave plate module, and configured to selectively rotate the polarizations of said fourth and sixth beams by 90-degree respectively.

30. The optical apparatus of claim 29 wherein third beam is incident on said first face at a first Brewster angle and said sixth beam is incident on said second face at a second Brewster angle.

31. The optical apparatus of claim 28 wherein said beam-swapping element comprises first and second faces parallel to third and fourth faces, and said second compensation plate comprises a fifth face parallel to a sixth face, wherein said half-wave plate module is optically coupled to receive said third, fourth, fifth and sixth beams from said second birefrigent element and configured to selectively rotate the polarizations of said third and fifth beams by 90-degree respectively, wherein said second wavelength filter is optically coupled to receive said third, fourth, fifth and sixth beams from said half-wave plate module and configured to selectively rotate the polarizations of said fourth and sixth beams by 90-degree respectively, wherein said third and sixth beams from said second wavelength filter are incident on said fifth face and emerge from said sixth face, and wherein said fourth and fifth beams from said second wavelength filter are incident on said first and second faces and emerge from said third and fourth faces respectively.

32. The optical apparatus of claim 31 wherein fourth beam is incident on said first face at a first Brewster angle and said fifth beam is incident on said second face at a second Brewster angle.

33. The optical apparatus of claim 28 wherein said beam-swapping element comprises first and second faces parallel to third and fourth faces, and said second compensation plate comprises a fifth face parallel to a sixth face, wherein said half-wave plate module is optically coupled to receive said third, fourth, fifth and sixth beams from said second birefrigent element and configured to selectively rotate the polarizations of said third and fifth beams by 90-degree respectively, wherein said third and sixth beams from said half-wave plate module are incident on said first and second faces and emerge from said third and fourth faces respectively, wherein said fourth and fifth beams from said half-wave plate module are incident on said fifth face and emerge from said sixth face, wherein said second wavelength filter is optically coupled to receive said third and sixth beams from said beam-swapping element and said fourth and fifth beams from said second compensation plate, and configured to selectively rotate the polarizations of said fourth and sixth beams by 90-degree respectively.

34. The optical apparatus of claim 33 wherein third beam is incident on said first face at a first Brewster angle and said sixth beam is incident on said second face at a second Brewster angle.

35. The optical apparatus of claim 28 wherein either of said first and second wavelength filters comprises a stacked plurality of birefrigent waveplates with each waveplate oriented in a predetermined direction.

36. The optical apparatus of claim 28 further comprising a roof prism optically coupled to receive said first and second output signals from said third birefrigent element, whereby said first and second output signals are directed to an output port.

37. The optical apparatus of claim 1 wherein said first, second, and birefrigent elements comprise one or more materials selected from the group consisting of calcite, rutile, lithium niobate, and $YVO_4$ based crystals.

38. The optical apparatus of claim 1 wherein first wavelength filter comprises a stacked plurality of birefrigent waveplates with each waveplate oriented in a predetermined direction.

39. A method of routing a wavelength division multiplexed (WDM) optical signal, comprising:
   a) providing a first input/output (I/O) port for receiving said WDM optical signal;
   b) spatially decomposing said WDM signal received from said first I/O port into first and second beams having orthogonal polarizations;
   c) decomposing said first beam into third and fourth beams with orthogonal polarizations and said second beam into fifth and sixth beams with orthogonal polarizations, wherein said third and fifth beams carry a first spectral set of wavelengths and said fourth and sixth beams carry a second spectral set of wavelengths, and wherein said first and second spectral sets are substantially complementary;
   d) spatially routing said third, forth, fifth, and sixth beams according to their polarizations;
   e) swapping two or more of said routed third, fourth, fifth and sixth beams in position, such that said third and fifth beams can be spatially combined into a first output signal carrying said first spectral set, and said fourth and sixth beams can be spatially combined into a second output signal carrying said second spectral set.

40. The method of claim 39 wherein said step of decomposing said WDX optical signal uses a birefrigent element.

41. The method of claim 39 wherein said step of spatially routing said third, fourth, fifth, and sixth beams uses a birefrigent element, whereby upon emerging said third, forth, fifth, and sixth beams are spatially positioned such that they can be construed as traveling along four corners of an imaginary "rectangular propagation pipe", with said third beam positioned diagonally relative to said fifth beam and said fourth beam positioned diagonally relative to said sixth beam.

42. The method of claim 41 wherein said step of swapping two or more of said routed third, fourth, fifth and sixth beams in position uses a beam-swapping element, whereby said third and fifth beams subsequently become positioned on a first side-plane of and said fourth and fifth beams subsequently become positioned on a second side-plane of said imaginary "rectangular propagation pipe", and wherein said first and second side-planes are parallel to each other.

43. The method of claim 42 wherein said beam-swapping element comprises one or more elements selected from the group consisting of hexagon plates, parallelogram plates, Dove prisms, and birefrigent plates.

44. The method of claim 43 wherein said beam-swapping element comprises first and second faces parallel to third and fourth faces.

45. The method of claim 44 wherein said third and sixth beams are incident on said first and second faces and emerge from said third and fourth faces.

46. The method of claim 45 wherein said third beam is incident on said first face at a first Brewster angle and said sixth beam is incident on said second face at a second Brewster angle.

47. The method of claim 44 wherein said fourth and fifth beams are incident on said first and second faces and emerge from said third and fourth faces.

48. The method of claim 47 wherein said fourth beam is incident on said first face at a first Brewster angle and said fifth beam is incident on said second face at a second Brewster angle.

49. The method of claim 43 wherein said beam-swapping element comprises a Dove prism having first and second faces, wherein said first and second faces are not parallel.

50. The method of claim 49 wherein said third and sixth beams are incident on said first face and emerge from said second face.

51. The method of claim 49 wherein said fourth and fifth beams are incident on said first face and emerge from said second face.

52. The method of claim 39 wherein said step of decomposing said first and second beams into said third, fourth, fifth, and sixth beams uses a wavelength filter.

53. The method of claim 39 wherein said third and fifth beams are spatially combined, and said fourth and sixth beams are spatially combined by way of a birefrigent element.

54. The method of claim 39 further comprising the step of ensuring that upon being combined said third and fifth beams have substantially equalized optical path lengths, and said fourth and sixth beams have substantially equalized optical path lengths.

55. The method of claim 39 wherein said step of decomposing said first and second beams into said third, fourth, fifth, and sixth beams uses a first wavelength filter, wherein said method further comprises the step of passing said third, fourth, fifth, and sixth beams through a second wavelength filter, wherein said second wavelength filter is configured to cancel out wavelength-filter-induced-dispersion (WFID) said first wavelength filter has inflicted onto each of said third, fourth, fifth, and sixth beams.

56. The optical apparatus of claim 55 wherein either of said first and second wavelength filters comprises a stacked plurality of birefrigent waveplates with each waveplate oriented in a predetermined direction.

* * * * *